United States Patent
Chaji et al.

(10) Patent No.: US 10,242,619 B2
(45) Date of Patent: Mar. 26, 2019

(54) PIXEL CIRCUITS FOR AMOLED DISPLAYS

(71) Applicant: Ignis Innovation Inc., Waterloo (CA)

(72) Inventors: Gholamreza Chaji, Waterloo (CA); Yaser Azizi, Waterloo (CA)

(73) Assignee: Ignis Innovation Inc., Waterloo (CA)

(*) Notice: Subject to any disclaimer, the term of this patent is extended or adjusted under 35 U.S.C. 154(b) by 6 days.

(21) Appl. No.: 15/903,698

(22) Filed: Feb. 23, 2018

(65) Prior Publication Data

US 2018/0182293 A1 Jun. 28, 2018

Related U.S. Application Data

(63) Continuation of application No. 15/635,653, filed on Jun. 28, 2017, now Pat. No. 9,934,725, which is a
(Continued)

(51) Int. Cl.
  *G09G 3/3233* (2016.01)
  *G06F 1/3218* (2019.01)
  *G06F 1/3234* (2019.01)

(52) U.S. Cl.
  CPC ......... *G09G 3/3233* (2013.01); *G06F 1/3218* (2013.01); *G06F 1/3265* (2013.01); *G09G 2300/0426* (2013.01); *G09G 2300/0866* (2013.01); *G09G 2310/08* (2013.01); *G09G 2320/0295* (2013.01); *G09G 2320/043* (2013.01); *G09G 2320/045* (2013.01); *G09G 2320/048* (2013.01); *G09G 2320/0613* (2013.01); *G09G 2320/0626* (2013.01); *G09G 2320/0693* (2013.01); *G09G 2330/021* (2013.01); *G09G 2330/022* (2013.01);
(Continued)

(58) Field of Classification Search
None
See application file for complete search history.

(56) References Cited

U.S. PATENT DOCUMENTS

| 3,506,851 A | 4/1970 | Polkinghorn |
| 3,750,987 A | 8/1973 | Gobel |

(Continued)

FOREIGN PATENT DOCUMENTS

| AU | 729652 | 6/1997 |
| AU | 764896 | 12/2001 |

(Continued)

OTHER PUBLICATIONS

Ahnood et al.: "Effect of threshold voltage instability on field effect mobility in thin film transistors deduced from constant current measurements"; dated Aug. 2009.
(Continued)

*Primary Examiner* — Kenneth B Lee, Jr.
(74) *Attorney, Agent, or Firm* — Stratford Managers Corporation

(57) ABSTRACT

A system for driving a display that includes a plurality of pixel circuits arranged in an array, each of the pixel circuits including a light emitting device and a driving transistor for conveying a driving current through the light emitting device. Methods of measuring characteristics of circuit elements of pixels sharing a monitor line include the control of biasing to selectively turn off circuit elements or render their response known while measuring other circuit elements of interest.

14 Claims, 11 Drawing Sheets

Related U.S. Application Data continuation of application No. 15/184,233, filed on Jun. 16, 2016, now Pat. No. 9,721,505, which is a continuation-in-part of application No. 14/491,763, filed on Sep. 19, 2014, now Pat. No. 9,886,899, which is a continuation-in-part of application No. 14/474,977, filed on Sep. 2, 2014, now abandoned, which is a continuation-in-part of application No. 13/789,978, filed on Mar. 8, 2013, now Pat. No. 9,351,368.

(52) U.S. Cl.
CPC ... *G09G 2330/023* (2013.01); *G09G 2360/18* (2013.01); *Y02D 10/153* (2018.01)

(56) References Cited

U.S. PATENT DOCUMENTS

| | | | |
|---|---|---|---|
| 3,774,055 A | 11/1973 | Bapat |
| 4,090,096 A | 5/1978 | Nagami |
| 4,354,162 A | 10/1982 | Wright |
| 4,402,075 A | 8/1983 | Bargeton |
| 4,996,523 A | 2/1991 | Bell |
| 5,134,387 A | 7/1992 | Smith |
| 5,153,420 A | 10/1992 | Hack |
| 5,170,158 A | 12/1992 | Shinya |
| 5,204,661 A | 4/1993 | Hack |
| 5,266,515 A | 11/1993 | Robb |
| 5,278,542 A | 1/1994 | Smith |
| 5,408,267 A | 4/1995 | Main |
| 5,498,880 A | 3/1996 | Lee |
| 5,572,444 A | 11/1996 | Lentz |
| 5,589,847 A | 12/1996 | Lewis |
| 5,619,033 A | 4/1997 | Weisfield |
| 5,648,276 A | 7/1997 | Hara |
| 5,670,973 A | 9/1997 | Bassetti |
| 5,691,783 A | 11/1997 | Numao |
| 5,701,505 A | 12/1997 | Yamashita |
| 5,714,968 A | 2/1998 | Ikeda |
| 5,744,824 A | 4/1998 | Kousai |
| 5,745,660 A | 4/1998 | Kolpatzik |
| 5,748,160 A | 5/1998 | Shieh |
| 5,758,129 A | 5/1998 | Gray |
| 5,835,376 A | 11/1998 | Smith |
| 5,870,071 A | 2/1999 | Kawahata |
| 5,874,803 A | 2/1999 | Garbuzov |
| 5,880,582 A | 3/1999 | Sawada |
| 5,881,299 A | 3/1999 | Nomura |
| 5,903,248 A | 5/1999 | Irwin |
| 5,917,280 A | 6/1999 | Burrows |
| 5,949,398 A | 9/1999 | Kim |
| 5,952,789 A | 9/1999 | Stewart |
| 5,990,629 A | 11/1999 | Yamada |
| 6,023,259 A | 2/2000 | Howard |
| 6,069,365 A | 5/2000 | Chow |
| 6,091,203 A | 7/2000 | Kawashima |
| 6,097,360 A | 8/2000 | Holloman |
| 6,100,868 A | 8/2000 | Lee |
| 6,144,222 A | 11/2000 | Ho |
| 6,229,506 B1 | 5/2001 | Dawson |
| 6,229,508 B1 | 5/2001 | Kane |
| 6,246,180 B1 | 6/2001 | Nishigaki |
| 6,252,248 B1 | 6/2001 | Sano |
| 6,268,841 B1 | 7/2001 | Cairns |
| 6,288,696 B1 | 9/2001 | Holloman |
| 6,307,322 B1 | 10/2001 | Dawson |
| 6,310,962 B1 | 10/2001 | Chung |
| 6,323,631 B1 | 11/2001 | Juang |
| 6,333,729 B1 | 12/2001 | Ha |
| 6,384,804 B1 | 5/2002 | Dodabalapur |
| 6,388,653 B1 | 5/2002 | Goto |
| 6,392,617 B1 | 5/2002 | Gleason |
| 6,396,469 B1 | 5/2002 | Miwa |
| 6,414,661 B1 | 7/2002 | Shen |
| 6,417,825 B1 | 7/2002 | Stewart |
| 6,430,496 B1 | 8/2002 | Smith |
| 6,433,488 B1 | 8/2002 | Bu |
| 6,473,065 B1 | 10/2002 | Fan |
| 6,475,845 B2 | 11/2002 | Kimura |
| 6,501,098 B2 | 12/2002 | Yamazaki |
| 6,501,466 B1 | 12/2002 | Yamagashi |
| 6,522,315 B2 | 2/2003 | Ozawa |
| 6,535,185 B2 | 3/2003 | Kim |
| 6,542,138 B1 | 4/2003 | Shannon |
| 6,559,839 B1 | 5/2003 | Ueno |
| 6,580,408 B1 | 6/2003 | Bae |
| 6,583,398 B2 | 6/2003 | Harkin |
| 6,618,030 B2 | 9/2003 | Kane |
| 6,639,244 B1 | 10/2003 | Yamazaki |
| 6,680,580 B1 | 1/2004 | Sung |
| 6,686,699 B2 | 2/2004 | Yumoto |
| 6,690,000 B1 | 2/2004 | Muramatsu |
| 6,693,610 B2 | 2/2004 | Shannon |
| 6,694,248 B2 | 2/2004 | Smith |
| 6,697,057 B2 | 2/2004 | Koyama |
| 6,724,151 B2 | 4/2004 | Yoo |
| 6,734,636 B2 | 5/2004 | Sanford |
| 6,753,655 B2 | 6/2004 | Shih |
| 6,753,834 B2 | 6/2004 | Mikami |
| 6,756,741 B2 | 6/2004 | Li |
| 6,756,958 B2 | 6/2004 | Furuhashi |
| 6,777,888 B2 | 8/2004 | Kondo |
| 6,781,567 B2 | 8/2004 | Kimura |
| 6,788,231 B1 | 9/2004 | Hsueh |
| 6,809,706 B2 | 10/2004 | Shimoda |
| 6,828,950 B2 | 12/2004 | Koyama |
| 6,858,991 B2 | 2/2005 | Miyazawa |
| 6,859,193 B1 | 2/2005 | Yumoto |
| 6,864,637 B2 | 3/2005 | Park |
| 6,876,346 B2 | 4/2005 | Anzai |
| 6,900,485 B2 | 5/2005 | Lee |
| 6,903,734 B2 | 6/2005 | Eu |
| 6,911,960 B1 | 6/2005 | Yokoyama |
| 6,911,964 B2 | 6/2005 | Lee |
| 6,914,448 B2 | 7/2005 | Jinno |
| 6,919,871 B2 | 7/2005 | Kwon |
| 6,924,602 B2 | 8/2005 | Komiya |
| 6,933,756 B2 | 8/2005 | Miyazawa |
| 6,937,220 B2 | 8/2005 | Kitaura |
| 6,940,214 B1 | 9/2005 | Komiya |
| 6,954,194 B2 | 10/2005 | Matsumoto |
| 6,970,149 B2 | 11/2005 | Chung |
| 6,975,142 B2 | 12/2005 | Azami |
| 6,975,332 B2 | 12/2005 | Arnold |
| 6,995,519 B2 | 2/2006 | Arnold |
| 7,027,015 B2 | 4/2006 | Booth, Jr. |
| 7,034,793 B2 | 4/2006 | Sekiya |
| 7,038,392 B2 | 5/2006 | Libsch |
| 7,057,588 B2 | 6/2006 | Asano |
| 7,061,451 B2 | 6/2006 | Kimura |
| 7,071,932 B2 | 7/2006 | Libsch |
| 7,106,285 B2 | 9/2006 | Naugler |
| 7,112,820 B2 | 9/2006 | Chang |
| 7,113,864 B2 | 9/2006 | Smith |
| 7,122,835 B1 | 10/2006 | Ikeda |
| 7,129,914 B2 | 10/2006 | Knapp |
| 7,164,417 B2 | 1/2007 | Cok |
| 7,224,332 B2 | 5/2007 | Cok |
| 7,248,236 B2 | 7/2007 | Nathan |
| 7,259,737 B2 | 8/2007 | Ono |
| 7,262,753 B2 | 8/2007 | Tanghe |
| 7,274,363 B2 | 9/2007 | Ishizuka |
| 7,310,092 B2 | 12/2007 | Imamura |
| 7,315,295 B2 | 1/2008 | Kimura |
| 7,317,434 B2 | 1/2008 | Lan |
| 7,321,348 B2 | 1/2008 | Cok |
| 7,327,357 B2 | 2/2008 | Jeong |
| 7,333,077 B2 | 2/2008 | Koyama |
| 7,343,243 B2 | 3/2008 | Smith |
| 7,414,600 B2 | 8/2008 | Nathan |
| 7,466,166 B2 | 12/2008 | Date |
| 7,495,501 B2 | 2/2009 | Iwabuchi |
| 7,502,000 B2 | 3/2009 | Yuki |
| 7,515,124 B2 | 4/2009 | Yaguma |

(56) References Cited

U.S. PATENT DOCUMENTS

| | | |
|---|---|---|
| 7,535,449 B2 | 5/2009 | Miyazawa |
| 7,554,512 B2 | 6/2009 | Steer |
| 7,569,849 B2 | 8/2009 | Nathan |
| 7,595,776 B2 | 9/2009 | Hashimoto |
| 7,604,718 B2 | 10/2009 | Zhang |
| 7,609,239 B2 | 10/2009 | Chang |
| 7,612,745 B2 | 11/2009 | Yumoto |
| 7,619,594 B2 | 11/2009 | Hu |
| 7,619,597 B2 | 11/2009 | Nathan |
| 7,639,211 B2 | 12/2009 | Miyazawa |
| 7,683,899 B2 | 3/2010 | Hirakata |
| 7,688,289 B2 | 3/2010 | Abe |
| 7,760,162 B2 | 7/2010 | Miyazawa |
| 7,808,008 B2 | 10/2010 | Miyake |
| 7,859,520 B2 | 12/2010 | Kimura |
| 7,889,159 B2 | 2/2011 | Nathan |
| 7,903,127 B2 | 3/2011 | Kwon |
| 7,920,116 B2 | 4/2011 | Woo |
| 7,944,414 B2 | 5/2011 | Shirasaki |
| 7,978,170 B2 | 7/2011 | Park |
| 7,989,392 B2 | 8/2011 | Crockett |
| 7,995,008 B2 | 8/2011 | Miwa |
| 8,063,852 B2 | 11/2011 | Kwak |
| 8,102,343 B2 | 1/2012 | Yatabe |
| 8,144,081 B2 | 3/2012 | Miyazawa |
| 8,159,007 B2 | 4/2012 | Barna |
| 8,242,979 B2 | 8/2012 | Anzai |
| 8,253,665 B2 | 8/2012 | Nathan |
| 8,283,967 B2 | 10/2012 | Chaji |
| 8,319,712 B2 | 11/2012 | Nathan |
| 8,456,581 B2 | 6/2013 | Kimura |
| 8,564,513 B2 | 10/2013 | Nathan |
| 8,665,214 B2 | 3/2014 | Forutanpour |
| 8,836,684 B2 | 9/2014 | Harada |
| 8,872,739 B2 | 10/2014 | Kimura |
| 8,878,816 B2 | 11/2014 | Chen |
| 9,153,172 B2 | 10/2015 | Nathan |
| 9,430,958 B2 | 8/2016 | Chaji |
| 9,466,240 B2 | 10/2016 | Jaffari |
| 9,472,138 B2 | 10/2016 | Nathan |
| 9,659,527 B2 | 5/2017 | Williams |
| 9,685,114 B2 | 7/2017 | Chaji |
| 9,697,771 B2 | 7/2017 | Azizi |
| 9,721,505 B2 * | 8/2017 | Chaji ................. G06F 1/3218 |
| 9,741,292 B2 | 8/2017 | Nathan |
| 9,747,834 B2 | 8/2017 | Chaji |
| RE46,561 E | 9/2017 | Chaji |
| 9,934,725 B2 * | 3/2018 | Chaji ................. G06F 1/3218 |
| 2001/0002703 A1 | 6/2001 | Koyama |
| 2001/0009283 A1 | 7/2001 | Arao |
| 2001/0024186 A1 | 9/2001 | Kane |
| 2001/0026257 A1 | 10/2001 | Kimura |
| 2001/0028226 A1 | 10/2001 | Malaviya |
| 2001/0030323 A1 | 10/2001 | Ikeda |
| 2001/0035863 A1 | 11/2001 | Kimura |
| 2001/0040541 A1 | 11/2001 | Yoneda |
| 2001/0043173 A1 | 11/2001 | Troutman |
| 2001/0045929 A1 | 11/2001 | Prache |
| 2001/0052940 A1 | 12/2001 | Hagihara |
| 2002/0000576 A1 | 1/2002 | Inukai |
| 2002/0011796 A1 | 1/2002 | Koyama |
| 2002/0011799 A1 | 1/2002 | Kimura |
| 2002/0012057 A1 | 1/2002 | Kimura |
| 2002/0030190 A1 | 3/2002 | Ohtani |
| 2002/0047565 A1 | 4/2002 | Nara |
| 2002/0052086 A1 | 5/2002 | Maeda |
| 2002/0080108 A1 | 6/2002 | Wang |
| 2002/0084463 A1 | 7/2002 | Sanford |
| 2002/0101172 A1 | 8/2002 | Bu |
| 2002/0117722 A1 | 8/2002 | Osada |
| 2002/0140712 A1 | 10/2002 | Ouchi |
| 2002/0158587 A1 | 10/2002 | Komiya |
| 2002/0158666 A1 | 10/2002 | Azami |
| 2002/0158823 A1 | 10/2002 | Zavracky |
| 2002/0171613 A1 | 11/2002 | Goto |
| 2002/0181276 A1 | 12/2002 | Yamazaki |
| 2002/0186214 A1 | 12/2002 | Siwinski |
| 2002/0190971 A1 | 12/2002 | Nakamura |
| 2002/0195967 A1 | 12/2002 | Kim |
| 2002/0195968 A1 | 12/2002 | Sanford |
| 2002/0196213 A1 | 12/2002 | Akimoto |
| 2003/0001828 A1 | 1/2003 | Asano |
| 2003/0001858 A1 | 1/2003 | Jack |
| 2003/0016190 A1 | 1/2003 | Kondo |
| 2003/0020413 A1 | 1/2003 | Oomura |
| 2003/0030603 A1 | 2/2003 | Shimoda |
| 2003/0062524 A1 | 4/2003 | Kimura |
| 2003/0062844 A1 | 4/2003 | Miyazawa |
| 2003/0076048 A1 | 4/2003 | Rutherford |
| 2003/0090445 A1 | 5/2003 | Chen |
| 2003/0090447 A1 | 5/2003 | Kimura |
| 2003/0090481 A1 | 5/2003 | Kimura |
| 2003/0095087 A1 | 5/2003 | Libsch |
| 2003/0098829 A1 | 5/2003 | Chen |
| 2003/0107560 A1 | 6/2003 | Yumoto |
| 2003/0107561 A1 | 6/2003 | Uchino |
| 2003/0111966 A1 | 6/2003 | Mikami |
| 2003/0112205 A1 | 6/2003 | Yamada |
| 2003/0112208 A1 | 6/2003 | Okabe |
| 2003/0117348 A1 | 6/2003 | Knapp |
| 2003/0122474 A1 | 7/2003 | Lee |
| 2003/0122747 A1 | 7/2003 | Shannon |
| 2003/0128199 A1 | 7/2003 | Kimura |
| 2003/0151569 A1 | 8/2003 | Lee |
| 2003/0156104 A1 | 8/2003 | Morita |
| 2003/0169241 A1 | 9/2003 | LeChevalier |
| 2003/0169247 A1 | 9/2003 | Kawabe |
| 2003/0174152 A1 | 9/2003 | Noguchi |
| 2003/0179626 A1 | 9/2003 | Sanford |
| 2003/0185438 A1 | 10/2003 | Osawa |
| 2003/0189535 A1 | 10/2003 | Matsumoto |
| 2003/0197663 A1 | 10/2003 | Lee |
| 2003/0214465 A1 | 11/2003 | Kimura |
| 2003/0227262 A1 | 12/2003 | Kwon |
| 2003/0230141 A1 | 12/2003 | Gilmour |
| 2003/0230980 A1 | 12/2003 | Forrest |
| 2004/0004443 A1 | 1/2004 | Park |
| 2004/0004589 A1 | 1/2004 | Shih |
| 2004/0032382 A1 | 2/2004 | Cok |
| 2004/0041750 A1 | 3/2004 | Abe |
| 2004/0066357 A1 | 4/2004 | Kawasaki |
| 2004/0070557 A1 | 4/2004 | Asano |
| 2004/0070558 A1 | 4/2004 | Cok |
| 2004/0090186 A1 | 5/2004 | Yoshida |
| 2004/0095338 A1 | 5/2004 | Miyazawa |
| 2004/0129933 A1 | 7/2004 | Nathan |
| 2004/0130516 A1 | 7/2004 | Nathan |
| 2004/0135749 A1 | 7/2004 | Kondakov |
| 2004/0145547 A1 | 7/2004 | Oh |
| 2004/0150595 A1 | 8/2004 | Kasai |
| 2004/0155841 A1 | 8/2004 | Kasai |
| 2004/0160516 A1 | 8/2004 | Ford |
| 2004/0171619 A1 | 9/2004 | Barkoczy |
| 2004/0174349 A1 | 9/2004 | Libsch |
| 2004/0174354 A1 | 9/2004 | Ono |
| 2004/0179005 A1 | 9/2004 | Jo |
| 2004/0183759 A1 | 9/2004 | Stevenson |
| 2004/0189627 A1 | 9/2004 | Shirasaki |
| 2004/0196275 A1 | 10/2004 | Hattori |
| 2004/0227697 A1 | 11/2004 | Mori |
| 2004/0228369 A1 | 11/2004 | Simmons |
| 2004/0239696 A1 | 12/2004 | Okabe |
| 2004/0251844 A1 | 12/2004 | Hashido |
| 2004/0252085 A1 | 12/2004 | Miyagawa |
| 2004/0252089 A1 | 12/2004 | Ono |
| 2004/0256617 A1 | 12/2004 | Yamada |
| 2004/0257353 A1 | 12/2004 | Imamura |
| 2004/0257355 A1 | 12/2004 | Naugler |
| 2004/0263437 A1 | 12/2004 | Hattori |
| 2004/0263506 A1 | 12/2004 | Koyama |
| 2005/0007357 A1 | 1/2005 | Yamashita |
| 2005/0052379 A1 | 3/2005 | Waterman |
| 2005/0057459 A1 | 3/2005 | Miyazawa |
| 2005/0067970 A1 | 3/2005 | Libsch |

(56) References Cited

U.S. PATENT DOCUMENTS

| | | |
|---|---|---|
| 2005/0067971 A1 | 3/2005 | Kane |
| 2005/0083270 A1 | 4/2005 | Miyazawa |
| 2005/0110420 A1 | 5/2005 | Arnold |
| 2005/0110727 A1 | 5/2005 | Shin |
| 2005/0123193 A1 | 6/2005 | Lamberg |
| 2005/0140600 A1 | 6/2005 | Kim |
| 2005/0140610 A1 | 6/2005 | Smith |
| 2005/0145891 A1 | 7/2005 | Abe |
| 2005/0156831 A1 | 7/2005 | Yamazaki |
| 2005/0168416 A1 | 8/2005 | Hashimoto |
| 2005/0206590 A1 | 9/2005 | Sasaki |
| 2005/0212787 A1 | 9/2005 | Noguchi |
| 2005/0219188 A1 | 10/2005 | Kawabe |
| 2005/0243037 A1 | 11/2005 | Eom |
| 2005/0248515 A1 | 11/2005 | Naugler |
| 2005/0258867 A1 | 11/2005 | Miyazawa |
| 2005/0285822 A1 | 12/2005 | Reddy |
| 2005/0285825 A1 | 12/2005 | Eom |
| 2006/0012310 A1 | 1/2006 | Chen |
| 2006/0012311 A1 | 1/2006 | Ogawa |
| 2006/0022305 A1 | 2/2006 | Yamashita |
| 2006/0038750 A1 | 2/2006 | Inoue |
| 2006/0038758 A1 | 2/2006 | Routley |
| 2006/0038762 A1 | 2/2006 | Chou |
| 2006/0066533 A1 | 3/2006 | Sato |
| 2006/0071887 A1 | 4/2006 | Chou |
| 2006/0077077 A1 | 4/2006 | Kwon |
| 2006/0077134 A1 | 4/2006 | Hector |
| 2006/0077194 A1 | 4/2006 | Jeong |
| 2006/0092185 A1 | 5/2006 | Jo |
| 2006/0114196 A1 | 6/2006 | Shin |
| 2006/0125408 A1 | 6/2006 | Nathan |
| 2006/0125740 A1 | 6/2006 | Shirasaki |
| 2006/0139253 A1 | 6/2006 | Choi |
| 2006/0145964 A1 | 7/2006 | Park |
| 2006/0158402 A1 | 7/2006 | Nathan |
| 2006/0191178 A1 | 8/2006 | Sempel |
| 2006/0208971 A1 | 9/2006 | Deane |
| 2006/0209012 A1 | 9/2006 | Hagood |
| 2006/0214888 A1 | 9/2006 | Schneider |
| 2006/0221009 A1 | 10/2006 | Miwa |
| 2006/0227082 A1 | 10/2006 | Ogata |
| 2006/0232522 A1 | 10/2006 | Roy |
| 2006/0244391 A1 | 11/2006 | Shishido |
| 2006/0244697 A1 | 11/2006 | Lee |
| 2006/0261841 A1 | 11/2006 | Fish |
| 2006/0279478 A1 | 12/2006 | Ikegami |
| 2006/0290614 A1 | 12/2006 | Nathan |
| 2007/0001939 A1 | 1/2007 | Hashimoto |
| 2007/0001945 A1 | 1/2007 | Yoshida |
| 2007/0008251 A1 | 1/2007 | Kohno |
| 2007/0008297 A1 | 1/2007 | Bassetti |
| 2007/0035340 A1 | 2/2007 | Kimura |
| 2007/0035489 A1 | 2/2007 | Lee |
| 2007/0035707 A1 | 2/2007 | Margulis |
| 2007/0040773 A1 | 2/2007 | Lee |
| 2007/0040782 A1 | 2/2007 | Woo |
| 2007/0057873 A1 | 3/2007 | Uchino |
| 2007/0057874 A1 | 3/2007 | Le Roy |
| 2007/0063932 A1 | 3/2007 | Nathan |
| 2007/0063959 A1 | 3/2007 | Iwabuchi |
| 2007/0075957 A1 | 4/2007 | Chen |
| 2007/0080908 A1 | 4/2007 | Nathan |
| 2007/0085801 A1 | 4/2007 | Park |
| 2007/0091050 A1 | 4/2007 | Katayama |
| 2007/0109232 A1 | 5/2007 | Yamamoto |
| 2007/0126000 A1 | 6/2007 | Lin |
| 2007/0128583 A1 | 6/2007 | Miyazawa |
| 2007/0164941 A1 | 7/2007 | Park |
| 2007/0176918 A1 | 8/2007 | Aho |
| 2007/0182671 A1 | 8/2007 | Nathan |
| 2007/0236430 A1 | 10/2007 | Fish |
| 2007/0236440 A1 | 10/2007 | Wacyk |
| 2007/0241999 A1 | 10/2007 | Lin |
| 2007/0242008 A1 | 10/2007 | Cummings |
| 2007/0296684 A1 | 12/2007 | Thomas |
| 2008/0001544 A1 | 1/2008 | Murakami |
| 2008/0043044 A1 | 2/2008 | Woo |
| 2008/0048951 A1 | 2/2008 | Naugler |
| 2008/0055134 A1 | 3/2008 | Li |
| 2008/0062106 A1 | 3/2008 | Tseng |
| 2008/0068307 A1 | 3/2008 | Kawabe |
| 2008/0074360 A1 | 3/2008 | Lu |
| 2008/0088549 A1 | 4/2008 | Nathan |
| 2008/0094426 A1 | 4/2008 | Kimpe |
| 2008/0111766 A1 | 5/2008 | Uchino |
| 2008/0122819 A1 | 5/2008 | Cho |
| 2008/0129906 A1 | 6/2008 | Lin |
| 2008/0180356 A1 | 7/2008 | Minami |
| 2008/0198103 A1 | 8/2008 | Toyomura |
| 2008/0228562 A1 | 9/2008 | Smith |
| 2008/0231625 A1 | 9/2008 | Minami |
| 2008/0231641 A1 | 9/2008 | Miyashita |
| 2008/0252590 A1 | 10/2008 | Doi |
| 2008/0265786 A1 | 10/2008 | Koyama |
| 2008/0290805 A1 | 11/2008 | Yamada |
| 2008/0291223 A1 | 11/2008 | Yamazaki |
| 2009/0009459 A1 | 1/2009 | Miyashita |
| 2009/0015532 A1 | 1/2009 | Katayama |
| 2009/0058789 A1 | 3/2009 | Hung |
| 2009/0121988 A1 | 5/2009 | Amo |
| 2009/0146926 A1 | 6/2009 | Sung |
| 2009/0153448 A1 | 6/2009 | Tomida |
| 2009/0153459 A9 | 6/2009 | Han |
| 2009/0174628 A1 | 7/2009 | Wang |
| 2009/0201230 A1 | 8/2009 | Smith |
| 2009/0201281 A1 | 8/2009 | Routley |
| 2009/0206764 A1 | 8/2009 | Schemmann |
| 2009/0219232 A1 | 9/2009 | Choi |
| 2009/0225011 A1 | 9/2009 | Choi |
| 2009/0244046 A1 | 10/2009 | Seto |
| 2009/0251452 A1 | 10/2009 | Kang |
| 2009/0251486 A1 | 10/2009 | Sakakibara |
| 2009/0278777 A1 | 11/2009 | Wang |
| 2009/0289964 A1 | 11/2009 | Miyachi |
| 2009/0295423 A1 | 12/2009 | Levey |
| 2010/0026725 A1 | 2/2010 | Smith |
| 2010/0033469 A1 | 2/2010 | Nathan |
| 2010/0039451 A1 | 2/2010 | Jung |
| 2010/0039453 A1 | 2/2010 | Nathan |
| 2010/0045646 A1 | 2/2010 | Kishi |
| 2010/0066714 A1 | 3/2010 | Ozaki |
| 2010/0079419 A1 | 4/2010 | Shibusawa |
| 2010/0129997 A1 | 5/2010 | Lin |
| 2010/0134475 A1 | 6/2010 | Ogura |
| 2010/0141564 A1 | 6/2010 | Choi |
| 2010/0141626 A1 | 6/2010 | Tomida |
| 2010/0207920 A1 | 8/2010 | Chaji |
| 2010/0225634 A1 | 9/2010 | Levey |
| 2010/0251295 A1 | 9/2010 | Amento |
| 2010/0269889 A1 | 10/2010 | Reinhold |
| 2010/0277400 A1 | 11/2010 | Jeong |
| 2010/0315319 A1 | 12/2010 | Cok |
| 2010/0315449 A1 | 12/2010 | Chaji |
| 2011/0050741 A1 | 3/2011 | Jeong |
| 2011/0063197 A1 | 3/2011 | Chung |
| 2011/0069089 A1 | 3/2011 | Kopf |
| 2011/0074762 A1 | 3/2011 | Shirasaki |
| 2011/0084993 A1 | 4/2011 | Kawabe |
| 2011/0109350 A1 | 5/2011 | Chaji |
| 2011/0157134 A1 | 6/2011 | Ogura |
| 2011/0169805 A1 | 7/2011 | Yamazaki |
| 2011/0191042 A1 | 8/2011 | Chaji |
| 2011/0205221 A1 | 8/2011 | Lin |
| 2012/0026146 A1 | 2/2012 | Kim |
| 2012/0054672 A1 | 3/2012 | McDowell |
| 2012/0169608 A1 | 7/2012 | Forutanpour |
| 2012/0169793 A1 | 7/2012 | Nathan |
| 2012/0280962 A1 | 11/2012 | Kawabe |
| 2012/0293481 A1 | 11/2012 | Chaji |
| 2012/0299976 A1 | 11/2012 | Chen |
| 2012/0299978 A1 | 11/2012 | Chaji |
| 2013/0099692 A1 | 4/2013 | Chaji |

(56) References Cited

U.S. PATENT DOCUMENTS

| | | |
|---|---|---|
| 2014/0225883 A1 | 8/2014 | Chaji |
| 2014/0267215 A1 | 9/2014 | Soni |
| 2014/0300281 A1 | 10/2014 | Chaji |

FOREIGN PATENT DOCUMENTS

| | | |
|---|---|---|
| CA | 1 294 034 | 1/1992 |
| CA | 2 249 592 | 7/1998 |
| CA | 2 303 302 | 3/1999 |
| CA | 2 368 386 | 9/1999 |
| CA | 2 242 720 | 1/2000 |
| CA | 2 354 018 | 6/2000 |
| CA | 2 432 530 | 7/2002 |
| CA | 2 436 451 | 8/2002 |
| CA | 2 507 276 | 8/2002 |
| CA | 2 463 653 | 1/2004 |
| CA | 2 498 136 | 3/2004 |
| CA | 2 522 396 | 11/2004 |
| CA | 2 438 363 | 2/2005 |
| CA | 2 443 206 | 3/2005 |
| CA | 2 519 097 | 3/2005 |
| CA | 2 472 671 | 12/2005 |
| CA | 2 523 841 | 1/2006 |
| CA | 2 567 076 | 1/2006 |
| CA | 2 495 726 | 7/2006 |
| CA | 2 557 713 | 11/2006 |
| CA | 2 526 782 C | 8/2007 |
| CA | 2 651 893 | 11/2007 |
| CA | 2 672 590 | 10/2009 |
| CN | 1588521 | 3/2005 |
| CN | 1601594 A | 3/2005 |
| CN | 1886774 | 12/2006 |
| CN | 101116129 A | 1/2008 |
| CN | 101395653 | 3/2009 |
| CN | 101908316 A | 12/2010 |
| CN | 101978412 A | 2/2011 |
| CN | 102741910 A | 10/2012 |
| CN | 103562989 A | 2/2014 |
| DE | 202006007613 | 9/2006 |
| EP | 0 478 186 | 4/1992 |
| EP | 1 028 471 A | 8/2000 |
| EP | 1 130 565 A1 | 9/2001 |
| EP | 1 194 013 | 4/2002 |
| EP | 1 321 922 | 6/2003 |
| EP | 1 335 430 A1 | 8/2003 |
| EP | 1 381 019 | 1/2004 |
| EP | 1 429 312 A | 6/2004 |
| EP | 1 439 520 A2 | 7/2004 |
| EP | 1 465 143 A | 10/2004 |
| EP | 1 473 689 A | 11/2004 |
| EP | 1 517 290 A2 | 3/2005 |
| EP | 1 521 203 A2 | 4/2005 |
| EP | 2 458 579 A2 | 5/2012 |
| GB | 2 399 935 | 9/2004 |
| GB | 2 460 018 | 11/2009 |
| JP | 09 090405 | 4/1997 |
| JP | 10-254410 | 9/1998 |
| JP | 11 231805 | 8/1999 |
| JP | 2002-278513 | 9/2002 |
| JP | 2003-076331 | 3/2003 |
| JP | 2003-099000 | 4/2003 |
| JP | 2003-173165 | 6/2003 |
| JP | 2003-186439 | 7/2003 |
| JP | 2003-195809 | 7/2003 |
| JP | 2003-271095 | 9/2003 |
| JP | 2003-308046 | 10/2003 |
| JP | 2004-054188 | 2/2004 |
| JP | 2004-226960 | 8/2004 |
| JP | 2005-004147 | 1/2005 |
| JP | 2005-099715 | 4/2005 |
| JP | 2005-258326 | 9/2005 |
| JP | 2005-338819 | 12/2005 |
| TW | 569173 | 1/2004 |
| TW | 200526065 | 8/2005 |
| TW | 1239501 | 9/2005 |
| WO | WO 98/11554 | 3/1998 |
| WO | WO 99/48079 | 9/1999 |
| WO | WO 01/27910 A1 | 4/2001 |
| WO | WO 02/067327 A | 8/2002 |
| WO | WO 03/034389 | 4/2003 |
| WO | WO 03/063124 | 7/2003 |
| WO | WO 03/075256 | 9/2003 |
| WO | WO 2004/003877 | 1/2004 |
| WO | WO 2004/015668 A1 | 2/2004 |
| WO | WO 2004/034364 | 4/2004 |
| WO | WO 2004/086347 A2 | 10/2004 |
| WO | WO 2005/022498 | 3/2005 |
| WO | WO 2005/055185 | 6/2005 |
| WO | WO 2005/055186 A1 | 6/2005 |
| WO | WO 2005/069267 | 7/2005 |
| WO | WO 2005/122121 | 12/2005 |
| WO | WO 2006/063448 | 6/2006 |
| WO | WO 2006/128069 | 11/2006 |
| WO | WO 2007/079572 | 7/2007 |
| WO | WO 2008/057369 | 5/2008 |
| WO | WO 2009/059028 | 5/2009 |
| WO | WO 2009/127065 | 10/2009 |
| WO | WO 2010/066030 | 6/2010 |
| WO | WO 2010/120733 | 10/2010 |

OTHER PUBLICATIONS

Alexander et al.: "Pixel circuits and drive schemes for glass and elastic AMOLED displays"; dated Jul. 2005 (9 pages).

Alexander et al.: "Unique Electrical Measurement Technology for Compensation Inspection and Process Diagnostics of AMOLED HDTV"; dated May 2010 (4 pages).

Ashtiani et al.: "AMOLED Pixel Circuit With Electronic Compensation of Luminance Degradation"; dated Mar. 2007 (4 pages).

Chaji et al.: "A Current-Mode Comparator for Digital Calibration of Amorphous Silicon AMOLED Displays"; dated Jul. 2008 (5 pages).

Chaji et al.: "A fast settling current driver based on the CCII for AMOLED displays"; dated Dec. 2009 (6 pages).

Chaji et al.: "A Low-Cost Stable Amorphous Silicon AMOLED Display with Full V~T- and V~O~L~E~D Shift Compensation"; dated May 2007 (4 pages).

Chaji et al.: "A low-power driving scheme for a-Si:H active-matrix organic light-emitting diode displays"; dated Jun. 2005 (4 pages).

Chaji et al.: "A low-power high-performance digital circuit for deep submicron technologies"; dated Jun. 2005 (4 pages).

Chaji et al.: "A novel a-Si:H AMOLED pixel circuit based on short-term stress stability of a-Si:H TFTs"; dated Oct. 2005 (3 pages).

Chaji et al.: "A Novel Driving Scheme and Pixel Circuit for AMOLED Displays"; dated Jun. 2006 (4 pages).

Chaji et al.: "A novel driving scheme for high-resolution large-area a-Si:H AMOLED displays"; dated Aug. 2005 (4 pages).

Chaji et al.: "A Stable Voltage-Programmed Pixel Circuit for a-Si:H AMOLED Displays"; dated Dec. 2006 (12 pages).

Chaji et al.: "A Sub-µA fast-settling current-programmed pixel circuit for AMOLED displays"; dated Sep. 2007.

Chaji et al.: "An Enhanced and Simplified Optical Feedback Pixel Circuit for AMOLED Displays"; dated Oct. 2006.

Chaji et al.: "Compensation technique for DC and transient instability of thin film transistor circuits for large-area devices"; dated Aug. 2008.

Chaji et al.: "Driving scheme for stable operation of 2-TFT a-Si AMOLED pixel"; dated Apr. 2005 (2 pages).

Chaji et al.: "Dynamic-effect compensating technique for stable a-Si:H AMOLED displays"; dated Aug. 2005 (4 pages).

Chaji et al.: "Electrical Compensation of OLED Luminance Degradation"; dated Dec. 2007 (3 pages).

Chaji et al.: "eUTDSP: a design study of a new VLIW-based DSP architecture"; dated May 2003 (4 pages).

Chaji et al.: "Fast and Offset-Leakage Insensitive Current-Mode Line Driver for Active Matrix Displays and Sensors"; dated Feb. 2009 (8 pages).

(56) References Cited

OTHER PUBLICATIONS

Chaji et al.: "High Speed Low Power Adder Design With a New Logic Style: Pseudo Dynamic Logic (SDL)"; dated Oct. 2001 (4 pages).
Chaji et al.: "High-precision fast current source for large-area current-programmed a-Si flat panels"; dated Sep. 2006 (4 pages).
Chaji et al.: "Low-Cost AMOLED Television with IGNIS Compensating Technology"; dated May 2008 (4 pages).
Chaji et al.: "Low-Cost Stable a-Si:H AMOLED Display for Portable Applications"; dated Jun. 2006 (4 pages).
Chaji et al.: "Low-Power Low-Cost Voltage-Programmed a-Si:H AMOLED Display"; dated Jun. 2008 (5 pages).
Chaji et al.: "Merged phototransistor pixel with enhanced near infrared response and flicker noise reduction for biomolecular imaging"; dated Nov. 2008 (3 pages).
Chaji et al.: "Parallel Addressing Scheme for Voltage-Programmed Active-Matrix OLED Displays"; dated May 2007 (6 pages).
Chaji et al.: "Pseudo dynamic logic (SDL): a high-speed and low-power dynamic logic family"; dated 2002 (4 pages).
Chaji et al.: "Stable a-Si:H circuits based on short-term stress stability of amorphous silicon thin film transistors"; dated May 2006 (4 pages).
Chaji et al.: "Stable Pixel Circuit for Small-Area High-Resolution a-Si:H AMOLED Displays"; dated Oct. 2008 (6 pages).
Chaji et al.: "Stable RGBW AMOLED display with OLED degradation compensation using electrical feedback"; dated Feb. 2010 (2 pages).
Chaji et al.: "Thin-Film Transistor Integration for Biomedical Imaging and AMOLED Displays"; dated May 2008 (177 pages).
Chao et al., "A New AMOLED Pixel Circuit With Pulsed Drive and Reverse Bias to Alleviate OLED Degradation," IEEE Transactions on Electron Devices, Apr. 2012, vol. 59, Issue 4, pp. 1123-1130.
Chapter 3: Color Spaces Keith Jack: Video Demystified: "A Handbook for the Digital Engineer" 2001 Referex ORD-0000-00-00 USA EP040425529 ISBN: 1-878707-56-6 pp. 32-33.
Chapter 8: Alternative Flat Panel Display 1-25 Technologies; Willem den Boer: "Active Matrix Liquid Crystal Display. Fundamentals and Applications" 2005 Referex ORD-0000-00-00 U.K.; XP040426102 ISBN: 0-7506-7813-5 pp. 206-209 p. 208.
European Partial Search Report Application No. 12 15 6251.6 European Patent Office dated May 30, 2012 (7 pages).
European Patent Office Communication Application No. 05 82 1114 dated Jan. 11, 2013 (9 pages).
European Patent Office Communication with Supplemental European Search Report for EP Application No. 07 70 1644.2 dated Aug. 18, 2009 (12 pages).
European Search Report Application No. 10 83 4294.0-1903 dated Apr. 8, 2013 (9 pages).
European Search Report Application No. EP 05 80 7905 dated Apr. 2, 2009 (5 pages).
European Search Report Application No. EP 05 82 1114 dated Mar. 27, 2009 (2 pages).
European Search Report Application No. EP 07 70 1644 dated Aug. 5, 2009.
European Search Report Application No. EP 10 17 5764 dated Oct. 18, 2010 (2 pages).
European Search Report Application No. EP 10 82 9593.2 European Patent Office dated May 17, 2013 (7 pages).
European Search Report Application No. EP 12 15 6251.6 European Patent Office dated Oct. 12, 2012 (18 pages).
European Search Report Application No. EP. 11 175 225.9 dated Nov. 4, 2011 (9 pages).
European Supplementary Search Report Application No. EP 09 80 2309 dated May 8, 2011 (14 pages).
European Supplementary Search Report Application No. EP 09 83 1339.8 dated Mar. 26, 2012 (11 pages).
Extended European Search Report Application No. EP 06 75 2777.0 dated Dec. 6, 2010 (21 pages).
Extended European Search Report Application No. EP 09 73 2338.0 dated May 24, 2011 (8 pages).
Extended European Search Report Application No. EP 11 17 5223, 4 dated Nov. 8, 2011 (8 pages).
Extended European Search Report Application No. EP 12 17 4465.0 European Patent Office dated Sep. 7, 2012 (9 pages).
Fan et al. "LTPS_TFT Pixel Circuit Compensation for TFT Threshold Voltage Shift and IR-Drop on the Power Line for Amolded Displays" 5 pages copyright 2012.
Goh et al. "A New a-Si:H Thin-Film Transistor Pixel Circuit for Active-Matrix Organic Light-Emitting Diodes" IEEE Electron Device Letters vol. 24 No. 9 Sep. 2003 pp. 583-585.
International Search Report Application No. PCT/CA2005/001844 dated Mar. 28, 2006 (2 pages).
International Search Report Application No. PCT/CA2006/000941 dated Oct. 3, 2006 (2 pages).
International Search Report Application No. PCT/CA2007/000013 dated May 7, 2007.
International Search Report Application No. PCT/CA2009/001049 dated Dec. 7, 2009 (4 pages).
International Search Report Application No. PCT/CA2009/001769 dated Apr. 8, 2010.
International Search Report Application No. PCT/IB2010/002898 Canadian Intellectual Property Office dated Jul. 28, 2009 (5 pages).
International Search Report Application No. PCT/IB2010/055481 dated Apr. 7, 2011 (3 pages).
International Search Report Application No. PCT/IB2011/051103 dated Jul. 8, 2011 3 pages.
International Search Report Application No. PCT/IB2012/052651 5 pages dated Sep. 11, 2012.
International Searching Authority Written Opinion Application No. PCT/IB2010/055481 dated Apr. 7, 2011 (6 pages ).
International Searching Authority Written Opinion Application No. PCT/IB2012/052651 6 pages dated Sep. 11, 2012.
International Searching Authority Written Opinion Application No. PCT/IB2011/051103 dated Jul. 8, 2011 6 pages.
International Searching Authority Written Opinion Application No. PCT/IB2010/002898 Canadian Intellectual Property Office dated Mar. 30, 2011 (8 pages).
International Searching Authority Written Opinion Application No. PCT/CA2009/001769 dated Apr. 8, 2010 (8 pages).
Jafarabadiashtiani et al.: "A New Driving Method for a-Si AMOLED Displays Based on Voltage Feedback"; dated May 2005 (4 pages).
Lee et al.: "Ambipolar Thin-Film Transistors Fabricated by PECVD Nanocrystalline Silicon"; dated May 2006 (6 pages).
Lin et al., "Lifetime Amelioration for an AMOLED Pixel Circuit by Using a Novel AC Driving Scheme," IEEE Transactions on Electron Devices, Aug. 2011, vol. 58, Issue 8, pp. 2652-2659.
Ma e y et al: "Organic Light-Emitting Diode/Thin Film Transistor Integration for foldable Displays" Conference record of the 1997 International display research conference and international workshops on LCD technology and emissive technology. Toronto Sep. 15-19, 1997 (6 pages).
Matsueda y et al.: "35.1: 2.5-in. AMOLED with Integrated 6-bit Gamma Compensated Digital Data Driver"; dated May 2004 (4 pages).
Nathan et al. "Amorphous Silicon Thin Film Transistor Circuit Integration for Organic LED Displays on Glass and Plastic" IEEE Journal of Solid-State Circuits vol. 39 No. 9 Sep. 2004 pp. 1477-1486.
Nathan et al.: "Backplane Requirements for Active Matrix Organic Light Emitting Diode Displays"; dated Sep. 2006 (16 pages).
Nathan et al.: "Call for papers second international workshop on compact thin-film transistor (TFT) modeling for circuit simulation"; dated Sep. 2009 (1 page).
Nathan et al.: "Driving schemes for a-Si and LTPS AMOLED displays"; dated Dec. 2005 (11 pages).
Nathan et al.: "Invited Paper: a-Si for AMOLED—Meeting the Performance and Cost Demands of Display Applications (Cell Phone to HDTV)"; dated Jun. 2006 (4 pages).
Nathan et al.: "Thin film imaging technology on glass and plastic"; dated Oct. 31-Nov. 2, 2000 (4 pages).

(56) References Cited

OTHER PUBLICATIONS

Ono et al. "Shared Pixel Compensation Circuit for AM-OLED Displays" Proceedings of the 9th Asian Symposium on Information Display (ASID) pp. 462-465 New Delhi dated Oct. 8-12, 2006 (4 pages).
Philipp: "Charge transfer sensing" Sensor Review vol. 19 No. 2 Dec. 31, 1999 (Dec. 31, 1999) 10 pages.
Rafati et al.: "Comparison of a 17 b multiplier in Dual-rail domino and in Dual-rail D L (D L) logic styles"; dated 2002 (4 pages).
Safavaian et al.: "Three-TFT image sensor for real-time digital X-ray imaging"; dated Feb. 2, 2006 (2 pages).
Safavian et al.: "3-TFT active pixel sensor with correlated double sampling readout circuit for real-time medical x-ray imaging"; dated Jun. 2006 (4 pages).
Safavian et al.: "A novel current scaling active pixel sensor with correlated double sampling readout circuit for real time medical x-ray imaging"; dated May 2007 (7 pages).
Safavian et al.: "A novel hybrid active-passive pixel with correlated double sampling CMOS readout circuit for medical x-ray imaging"; dated May 2008 (4 pages).
Safavian et al.: "Self-compensated a-Si:H detector with current-mode readout circuit for digital X-ray fluoroscopy"; dated Aug. 2005 (4 pages).
Safavian et al.: "TFT active image sensor with current-mode readout circuit for digital x-ray fluoroscopy [5969D-82]"; dated Sep. 2005 (9 pages).
Servati et al., "Static Characteristics of a-Si:H Dual-Gate TFTs," IEEE Transactions on Electron Devices, Apr. 2003, vol. 50, Issue 4, pp. 926-932.
Smith, Lindsay I., "A tutorial on Principal Components Analysis," dated Feb. 26, 2001 (27 pages).
Stewart M. et al. "Polysilicon TFT technology for active matrix OLED displays" IEEE transactions on electron devices vol. 48 No. 5 May 2001 (7 pages).
Vygranenko et al.: "Stability of indium-oxide thin-film transistors by reactive ion beam assisted deposition"; dated Feb. 2009.
Wang et al.: "Indium oxides by reactive ion beam assisted evaporation: From material study to device application," dated Mar. 2009 (6 pages).
Yi He et al. "Current-Source a-Si:H Thin Film Transistor Circuit for Active-Matrix Organic Light-Emitting Displays" IEEE Electron Device Letters vol. 21 No. 12 Dec. 2000 pp. 590-592.
International Search Report Application No. PCT/IB2013/059074, dated Dec. 18, 2013 (5 pages).
International Searching Authority Written Opinion Application No. PCT/IB2013/059074, dated Dec. 18, 2013 (8 pages).
Extended European Search Report Application No. EP 15173106.4 dated Oct. 15, 2013 (8 pages).
International Search Report Application No. PCT/IB2016/053592, dated Sep. 26, 2016 (5 pages).
Written Opinion of the International Searching Authority, International Application No. PCT/IB2016/053592, dated Sep. 26, 2016 (5 pages).
International Search Report Application No. PCT/IB2017/050170, dated May 5, 2017 (3 pages).
International Searching Authority Written Opinion Application No. PCT/IB2017/050170, dated May 5, 2017 (4 pages).

\* cited by examiner

PIXEL CIRCUITS FOR AMOLED DISPLAYS

CROSS REFERENCE TO RELATED APPLICATIONS

This application is a continuation of U.S. patent application Ser. No. 15/635,653, filed Jun. 28, 2017, now allowed, which is a continuation of U.S. patent application Ser. No. 15/184,233, filed Jun. 16, 2016, now U.S. Pat. No. 9,721,505, which claims priority to Canadian Application No. 2,894,717, filed Jun. 19, 2015, and is a continuation-in-part of and claims the benefit of U.S. patent application Ser. No. 14/491,763, filed Sep. 19, 2014, now U.S. Pat. No. 9,886,899, which is a continuation-in-part of U.S. patent application Ser. No. 14/474,977, filed Sep. 2, 2014, which is a continuation-in-part of U.S. patent application Ser. No. 13/789,978, filed Mar. 8, 2013, now U.S. Pat. No. 9,351,368, each of which is hereby incorporated by reference herein in its entirety.

FIELD OF THE INVENTION

The present disclosure generally relates to circuits for use in displays, and methods of driving, calibrating, and programming displays, particularly displays such as active matrix organic light emitting diode displays.

BACKGROUND

Displays can be created from an array of light emitting devices each controlled by individual circuits (i.e., pixel circuits) having transistors for selectively controlling the circuits to be programmed with display information and to emit light according to the display information. Thin film transistors ("TFTs") fabricated on a substrate can be incorporated into such displays. TFTs tend to demonstrate non-uniform behavior across display panels and over time as the displays age. Compensation techniques can be applied to such displays to achieve image uniformity across the displays and to account for degradation in the displays as the displays age.

Some schemes for providing compensation to displays to account for variations across the display panel and over time utilize monitoring systems to measure time dependent parameters associated with the aging (i.e., degradation) of the pixel circuits. The measured information can then be used to inform subsequent programming of the pixel circuits so as to ensure that any measured degradation is accounted for by adjustments made to the programming. Such monitored pixel circuits may require the use of additional transistors and/or lines to selectively couple the pixel circuits to the monitoring systems and provide for reading out information. The incorporation of additional transistors and/or lines may undesirably decrease pixel-pitch (i.e., "pixel density").

SUMMARY

In accordance with one aspect, there is provided a method of determining characteristics of at least one circuit element of at least one selected pixel in an array of pixels in a display in which each pixel includes a drive transistor for supplying current to an optoelectronic device of the pixel, the method comprising: controlling a biasing of a selected pixel of the at least one selected pixel including a biasing over a monitor line coupled to the selected pixel; controlling a biasing of a first drive transistor; of a first pixel such that a first optoelectronic device of said first pixel is biased so that the first optoelectronic device is turned off, the first pixel sharing the monitor line with the selected pixel; and measuring at least one characteristic of the at least one circuit element of said selected pixel with use of said monitor line.

In some embodiments, one of a source and a drain terminal of the first drive transistor is coupled to the first optoelectronic device and the other of the source and drain terminal of the first drive transistor is coupled to a first supply voltage, and wherein the monitor line is coupled via a first source switch to a first node of the first pixel, the first node between the optoelectronic device and the one of a source and a drain terminal of the first drive transistor, and controlling a biasing of the first drive transistor of the first pixel comprises adjusting at least a voltage of the first supply voltage and a gate terminal of the first drive transistor to ensure the first optoelectronic device is off.

In accordance with another aspect, there is provided a method of determining the characteristics of circuit elements of at least one selected pixel in an array of pixels in a display in which each pixel includes a drive transistor for supplying current to an optoelectronic device of the pixel, the method comprising: controlling a biasing of a selected pixel of the at least one selected pixel, said biasing including a biasing over a monitor line coupled to the selected pixel; controlling a biasing of a first pixel coupled to the monitor line via source and drain terminals of a first source switch such that the first source switch is biased with at least one of a zero voltage and a fixed known voltage across the source and the drain terminal of the first source switch resulting in a corresponding one of a zero current and a fixed known current passing through the first source switch, the monitor line shared with the selected pixel; and measuring at least one characteristic of at least one circuit element of said selected pixel with use of said monitor line.

In some embodiments, measuring at least one characteristic of at least one circuit element of said selected pixel comprises measuring the current of the selected optoelectronic device by measuring a current over the monitor line. In some embodiments, measuring at least one characteristic of at least one circuit element of said selected pixel further comprises subtracting a value of the fixed known current from the current measured over the monitor line.

In some embodiments, one of a source and a drain terminal of the first drive transistor is coupled to the first optoelectronic device and the other of the source and drain terminal of the first drive transistor is coupled to a first supply voltage, and wherein one of the source and the drain terminal of the first source switch is coupled to a first node of the first pixel between the optoelectronic device and the one of a source and a drain terminal of the first drive transistor, and the other of the source and the drain terminal of the first source switch is coupled to the monitor line, wherein controlling a biasing of the first pixel comprises biasing a gate of the first drive transistor to turn the first drive transistor on and adjusting a biasing over the monitor line to one of a voltage equal the voltage of the supply voltage and a voltage different from the voltage of the supply voltage by the fixed known voltage, and wherein biasing of the selected pixel comprises biasing a gate of the selected drive transistor to turn the selected drive transistor off.

In accordance with a further aspect there is provided a method of determining characteristics of at least one circuit element of at least one selected pixel sharing a monitor line, said selected pixels in an array of pixels in a display in which each pixel includes a drive transistor for supplying current to an optoelectronic device of the pixel, the method comprising: controlling a biasing of a first number of selected pixels of the at least one selected pixel, each selected pixel including a second number of circuit elements of the at least one circuit element, the biasing including a biasing over a monitor line coupled to the first number of selected pixels, the controlling the biasing of the first number of selected pixels having a total number of degrees of freedom of biasing greater than or equal to the product of the first number multiplied by the second number; and measuring with use of said monitor line at least one characteristic of the second number of circuit elements of the first number of selected pixels, while controlling a biasing of a first number of selected pixels, taking at least a number of measurements equal to the product of the first number multiplied by the second number.

In accordance with another further aspect there is provided a method of determining the characteristics of circuit elements of at least one selected pixel in an array of pixels in a display in which each pixel includes a drive transistor for supplying current to an optoelectronic device of the pixel, the method comprising: controlling a biasing of a selected pixel of the at least one selected pixel, said biasing including adjusting a biasing of a gate of a selected drive transistor of the selected pixel until a specific current passes through a selected source switch coupling the selected pixel to a monitor line; controlling a biasing of a first pixel coupled to the monitor line via source and drain terminals of a first source switch such that the first source switch is biased with at least one of a zero voltage and a fixed known voltage across the source and the drain terminal of the first source switch resulting in a corresponding one of a zero current and a fixed known current passing through the first source switch, the monitor line shared with the selected pixel; and measuring at least one characteristic of at least one circuit element of said selected pixel with use of said monitor line.

In some embodiments, the controlling of the biasing of the selected pixel comprises adjusting a voltage applied to the gate of the selected drive transistor until a predetermined current through the selected source switch of the selected pixel is measured over the monitor line, the method further comprising determining a change in characteristics of a selected optoelectronic device of the at least one selected pixel with use of a value of the voltage applied to the gate of the selected drive transistor.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
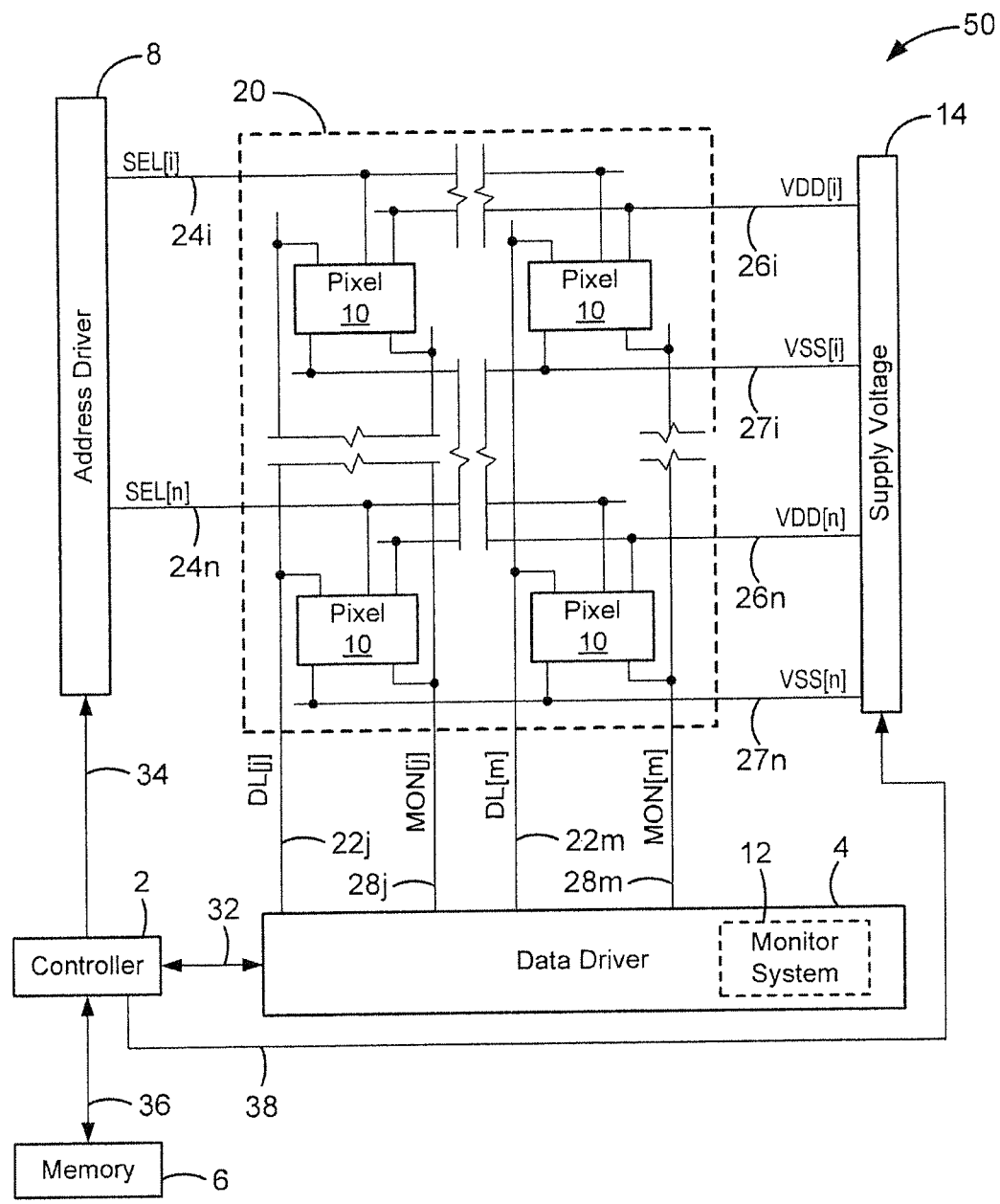
FIG. 1 is a block diagram of an exemplary configuration of a system for driving an OLED display while monitoring the degradation of the individual pixels and providing compensation therefor.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 is a diagram of an exemplary display system 50. The display system 50 includes an address driver 8, a data driver 4, a controller 2, a memory storage 6, and display panel 20. The display panel 20 includes an array of pixels 10 arranged in rows and columns. Each of the pixels 10 is individually programmable to emit light with individually programmable luminance values. The controller 2 receives digital data indicative of information to be displayed on the display panel 20. The controller 2 sends signals 32 to the data driver 4 and scheduling signals 34 to the address driver 8 to drive the pixels 10 in the display panel 20 to display the information indicated. The plurality of pixels 10 associated with the display panel 20 thus comprise a display array ("display screen") adapted to dynamically display information according to the input digital data received by the controller 2. The display screen can display, for example, video information from a stream of video data received by the controller 2. The supply voltage 14 can provide a constant power voltage or can be an adjustable voltage supply that is controlled by signals from the controller 2. The display system 50 can also incorporate features from a current source or sink (not shown) to provide biasing currents to the pixels 10 in the display panel 20 to thereby decrease programming time for the pixels 10.

For illustrative purposes, the display system 50 in FIG. 1 is illustrated with only four pixels 10 in the display panel 20. It is understood that the display system 50 can be implemented with a display screen that includes an array of similar pixels, such as the pixels 10, and that the display screen is not limited to a particular number of rows and columns of pixels. For example, the display system 50 can be implemented with a display screen with a number of rows and columns of pixels commonly available in displays for mobile devices, monitor-based devices, and/or projection-devices.

The pixel 10 is operated by a driving circuit ("pixel circuit") that generally includes a driving transistor and a light emitting device. Hereinafter the pixel 10 may refer to the pixel circuit. The light emitting device can optionally be an organic light emitting diode, but implementations of the present disclosure apply to pixel circuits having other electroluminescence devices, including current-driven light emitting devices. The driving transistor in the pixel 10 can optionally be an n-type or p-type amorphous silicon thin-film transistor, but implementations of the present disclosure are not limited to pixel circuits having a particular polarity of transistor or only to pixel circuits having thin-film transistors. The pixel circuit 10 can also include a storage capacitor for storing programming information and allowing the pixel circuit 10 to drive the light emitting device after being addressed. Thus, the display panel 20 can be an active matrix display array.

As illustrated in FIG. 1, the pixel 10 illustrated as the top-left pixel in the display panel 20 is coupled to a select line 24$i$, a supply line 26$i$, a data line 22$j$, and a monitor line 28$j$. A read line may also be included for controlling connections to the monitor line. In one implementation, the supply voltage 14 can also provide a second supply line to the pixel 10. For example, each pixel can be coupled to a first supply line 26 charged with Vdd and a second supply line 27 coupled with Vss, and the pixel circuits 10 can be situated between the first and second supply lines to facilitate driving current between the two supply lines during an emission phase of the pixel circuit. The top-left pixel 10 in the display panel 20 can correspond a pixel in the display panel in a "ith" row and "jth" column of the display panel 20. Similarly, the top-right pixel 10 in the display panel 20 represents a "jth" row and "mth" column; the bottom-left pixel 10 represents an "nth" row and "jth" column; and the bottom-right pixel 10 represents an "nth" row and "mth" column. Each of the pixels 10 is coupled to appropriate select lines (e.g., the select lines 24$i$ and 24$n$), supply lines (e.g., the supply lines 26$i$ and 26$n$), data lines (e.g., the data lines 22$j$ and 22$m$), and monitor lines (e.g., the monitor lines 28$j$ and 28$m$). It is noted that aspects of the present disclosure apply to pixels having additional connections, such as connections to additional select lines, and to pixels having fewer connections, such as pixels lacking a connection to a monitoring line.

With reference to the top-left pixel 10 shown in the display panel 20, the select line 24$i$ is provided by the address driver 8, and can be utilized to enable, for example, a programming operation of the pixel 10 by activating a switch or transistor to allow the data line 22$j$ to program the pixel 10. The data line 22$j$ conveys programming information from the data driver 4 to the pixel 10. For example, the data line 22$j$ can be utilized to apply a programming voltage or a programming current to the pixel 10 in order to program the pixel 10 to emit a desired amount of luminance. The programming voltage (or programming current) supplied by the data driver 4 via the data line 22$j$ is a voltage (or current) appropriate to cause the pixel 10 to emit light with a desired amount of luminance according to the digital data received by the controller 2. The programming voltage (or programming current) can be applied to the pixel 10 during a programming operation of the pixel 10 so as to charge a storage device within the pixel 10, such as a storage capacitor, thereby enabling the pixel 10 to emit light with the desired amount of luminance during an emission operation following the programming operation. For example, the storage device in the pixel 10 can be charged during a programming operation to apply a voltage to one or more of a gate or a source terminal of the driving transistor during the emission operation, thereby causing the driving transistor to convey the driving current through the light emitting device according to the voltage stored on the storage device.

Generally, in the pixel 10, the driving current that is conveyed through the light emitting device by the driving transistor during the emission operation of the pixel 10 is a current that is supplied by the first supply line 26$i$ and is drained to a second supply line 27$i$. The first supply line 26$i$ and the second supply line 27$i$ are coupled to the voltage supply 14. The first supply line 26$i$ can provide a positive supply voltage (e.g., the voltage commonly referred to in circuit design as "Vdd") and the second supply line 27$i$ can provide a negative supply voltage (e.g., the voltage commonly referred to in circuit design as "Vss"). Implementations of the present disclosure can be realized where one or the other of the supply lines (e.g., the supply line 27$i$) is fixed at a ground voltage or at another reference voltage.

The display system 50 also includes a monitoring system 12. With reference again to the top left pixel 10 in the display panel 20, the monitor line 28$j$ connects the pixel 10 to the monitoring system 12. The monitoring system 12 can be integrated with the data driver 4, or can be a separate stand-alone system. In particular, the monitoring system 12 can optionally be implemented by monitoring the current and/or voltage of the data line 22$j$ during a monitoring operation of the pixel 10, and the monitor line 28$j$ can be entirely omitted. Additionally, the display system 50 can be implemented without the monitoring system 12 or the monitor line 28$j$. The monitor line 28$j$ allows the monitoring system 12 to measure a current or voltage associated with the pixel 10 and thereby extract information indicative of a degradation of the pixel 10. For example, the monitoring system 12 can extract, via the monitor line 28$j$, a current flowing through the driving transistor within the pixel 10 and thereby determine, based on the measured current and based on the voltages applied to the driving transistor during the measurement, a threshold voltage of the driving transistor or a shift thereof.

The monitoring system 12 can also extract an operating voltage of the light emitting device (e.g., a voltage drop across the light emitting device while the light emitting device is operating to emit light). The monitoring system 12 can then communicate signals 32 to the controller 2 and/or the memory 6 to allow the display system 50 to store the extracted degradation information in the memory 6. During subsequent programming and/or emission operations of the pixel 10, the degradation information is retrieved from the memory 6 by the controller 2 via memory signals 36, and the controller 2 then compensates for the extracted degradation information in subsequent programming and/or emission operations of the pixel 10. For example, once the degradation information is extracted, the programming information conveyed to the pixel 10 via the data line 22$j$ can be appropriately adjusted during a subsequent programming operation of the pixel 10 such that the pixel 10 emits light with a desired amount of luminance that is independent of the degradation of the pixel 10. In an example, an increase in the threshold voltage of the driving transistor within the pixel 10 can be compensated for by appropriately increasing the programming voltage applied to the pixel 10.

Figure 2A:
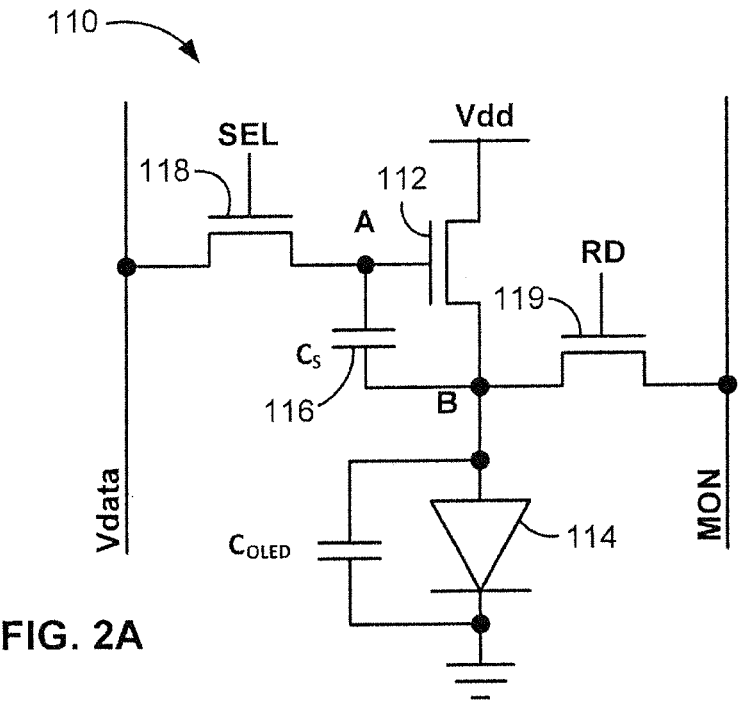
FIG. 2A is a circuit diagram of an exemplary pixel circuit configuration.

FIG. 2A is a circuit diagram of an exemplary driving circuit for a pixel 110. The driving circuit shown in FIG. 2A is utilized to calibrate, program and drive the pixel 110 and includes a drive transistor 112 for conveying a driving current through an organic light emitting diode ("OLED") 114. The OLED 114 emits light according to the current passing through the OLED 114, and can be replaced by any current-driven light emitting device. The OLED 114 has an inherent capacitance $C_{OLED}$. The pixel 110 can be utilized in the display panel 20 of the display system 50 described in connection with FIG. 1.

The driving circuit for the pixel 110 also includes a storage capacitor 116 and a switching transistor 118. The pixel 110 is coupled to a select line SEL, a voltage supply line Vdd, a data line Vdata, and a monitor line MON. The driving transistor 112 draws a current from the voltage supply line Vdd according to a gate-source voltage (Vgs) across the gate and source terminals of the drive transistor 112. For example, in a saturation mode of the drive transistor 112, the current passing through the drive transistor 112 can be given by Ids=β (Vgs−Vt)$^2$, where β is a parameter that depends on device characteristics of the drive transistor 112, Ids is the current from the drain terminal to the source terminal of the drive transistor 112, and Vt is the threshold voltage of the drive transistor 112.

In the pixel 110, the storage capacitor 116 is coupled across the gate and source terminals of the drive transistor 112. The storage capacitor 116 has a first terminal, which is referred to for convenience as a gate-side terminal, and a second terminal, which is referred to for convenience as a source-side terminal. The gate-side terminal of the storage capacitor 116 is electrically coupled to the gate terminal of the drive transistor 112. The source-side terminal 116s of the storage capacitor 116 is electrically coupled to the source terminal of the drive transistor 112. Thus, the gate-source voltage Vgs of the drive transistor 112 is also the voltage charged on the storage capacitor 116. As will be explained further below, the storage capacitor 116 can thereby maintain a driving voltage across the drive transistor 112 during an emission phase of the pixel 110.

The drain terminal of the drive transistor 112 is connected to the voltage supply line Vdd, and the source terminal of the drive transistor 112 is connected to (1) the anode terminal of the OLED 114 and (2) a monitor line MON via a read transistor 119. A cathode terminal of the OLED 114 can be connected to ground or can optionally be connected to a second voltage supply line, such as the supply line Vss shown in FIG. 1. Thus, the OLED 114 is connected in series with the current path of the drive transistor 112. The OLED 114 emits light according to the magnitude of the current passing through the OLED 114, once a voltage drop across the anode and cathode terminals of the OLED achieves an operating voltage ($V_{OLED}$) of the OLED 114. That is, when the difference between the voltage on the anode terminal and the voltage on the cathode terminal is greater than the operating voltage $V_{OLED}$, the OLED 114 turns on and emits light. When the anode-to-cathode voltage is less than $V_{OLED}$, current does not pass through the OLED 114.

The switching transistor 118 is operated according to the select line SEL (e.g., when the voltage on the select line SEL is at a high level, the switching transistor 118 is turned on, and when the voltage SEL is at a low level, the switching transistor is turned off). When turned on, the switching transistor 118 electrically couples node A (the gate terminal of the driving transistor 112 and the gate-side terminal of the storage capacitor 116) to the data line Vdata.

The read transistor 119 is operated according to the read line RD (e.g., when the voltage on the read line RD is at a high level, the read transistor 119 is turned on, and when the voltage RD is at a low level, the read transistor 119 is turned off). When turned on, the read transistor 119 electrically couples node B (the source terminal of the driving transistor 112, the source-side terminal of the storage capacitor 116, and the anode of the OLED 114) to the monitor line MON.

Figure 2B:
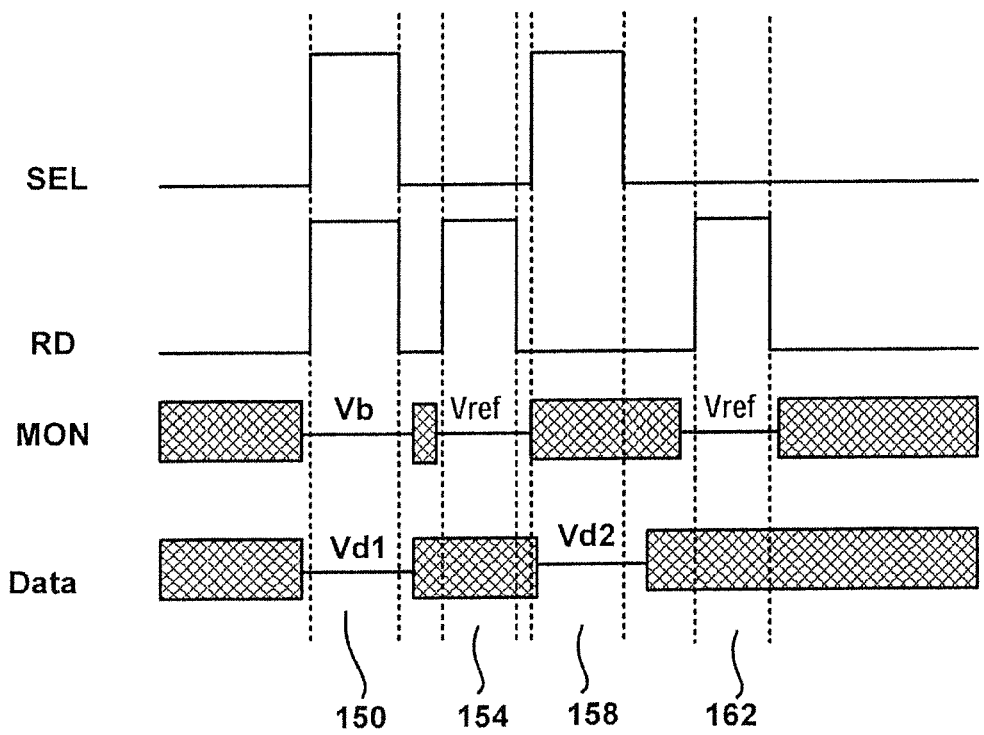
FIG. 2B is a timing diagram of first exemplary operation cycles for the pixel shown in FIG. 2A.

FIG. 2B is a timing diagram of exemplary operation cycles for the pixel 110 shown in FIG. 2A. During a first cycle 150, both the SEL line and the RD line are high, so the corresponding transistors 118 and 119 are turned on. The switching transistor 118 applies a voltage Vd1, which is at a level sufficient to turn on the drive transistor 112, from the data line Vdata to node A. The read transistor 119 applies a monitor-line voltage Vb, which is at a level that turns the OLED 114 off, from the monitor line MON to node B. As a result, the gate-source voltage Vgs is independent of $V_{OLED}$ (Vd1−Vb−Vds3, where Vds3 is the voltage drop across the read transistor 119). The SEL and RD lines go low at the end of the cycle 150, turning off the transistors 118 and 119.

During the second cycle 154, the SEL line is low to turn off the switching transistor 118, and the drive transistor 112 is turned on by the charge on the capacitor 116 at node A. The voltage on the read line RD goes high to turn on the read transistor 119 and thereby permit a first sample of the drive transistor current to be taken via the monitor line MON, while the OLED 114 is off. The voltage on the monitor line MON is Vref, which may be at the same level as the voltage Vb in the previous cycle.

During the third cycle 158, the voltage on the select line SEL is high to turn on the switching transistor 118, and the voltage on the read line RD is low to turn off the read transistor 119. Thus, the gate of the drive transistor 112 is charged to the voltage Vd2 of the data line Vdata, and the source of the drive transistor 112 is set to $V_{OLED}$ by the OLED 114. Consequently, the gate-source voltage Vgs of the drive transistor 112 is a function of $V_{OLED}$ (Vgs=Vd2−$V_{OLED}$).

During the fourth cycle 162, the voltage on the select line SEL is low to turn off the switching transistor, and the drive transistor 112 is turned on by the charge on the capacitor 116 at node A. The voltage on the read line RD is high to turn on the read transistor 119, and a second sample of the current of the drive transistor 112 is taken via the monitor line MON.

If the first and second samples of the drive current are not the same, the voltage Vd2 on the Vdata line is adjusted, the programming voltage Vd2 is changed, and the sampling and adjustment operations are repeated until the second sample of the drive current is the same as the first sample. When the two samples of the drive current are the same, the two gate-source voltages should also be the same, which means that:

$$V_{OLED} = Vd2 - Vgs$$
$$= Vd2 - (Vd1 - Vb - Vds3)$$
$$= Vd2 - Vd1 + Vb + Vds3.$$

After some operation time (t), the change in $V_{OLED}$ between time 0 and time t is $\Delta V_{OLED}=V_{OLED}(t)-V_{OLED}(0)=Vd2(t)-Vd2(0)$. Thus, the difference between the two programming voltages Vd2(t) and Vd2(0) can be used to extract the OLED voltage.

Figure 2C:
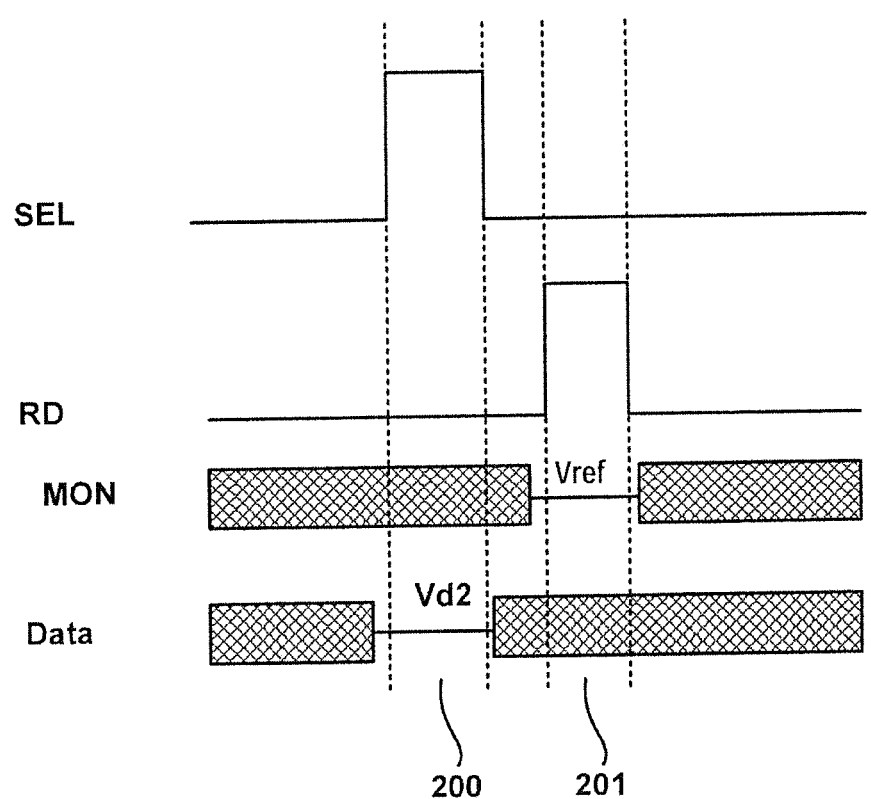
FIG. 2C is a timing diagram of second exemplary operation cycles for the pixel shown in FIG. 2A.

FIG. 2C is a modified schematic timing diagram of another set of exemplary operation cycles for the pixel 110 shown in FIG. 2A, for taking only a single reading of the drive current and comparing that value with a known reference value. For example, the reference value can be the desired value of the drive current derived by the controller to compensate for degradation of the drive transistor 112 as it ages. The OLED voltage $V_{OLED}$ can be extracted by measuring the difference between the pixel currents when the pixel is programmed with fixed voltages in both methods (being affected by $V_{OLED}$ and not being affected by $V_{OLED}$). This difference and the current-voltage characteristics of the pixel can then be used to extract $V_{OLED}$.

During the first cycle 200 of the exemplary timing diagram in FIG. 2C, the select line SEL is high to turn on the switching transistor 118, and the read line RD is low to turn off the read transistor 118. The data line Vdata supplies a voltage Vd2 to node A via the switching transistor 118. During the second cycle 201, SEL is low to turn off the switching transistor 118, and RD is high to turn on the read transistor 119. The monitor line MON supplies a voltage Vref to the node B via the read transistor 118, while a reading of the value of the drive current is taken via the read transistor 119 and the monitor line MON. This read value is compared with the known reference value of the drive current and, if the read value and the reference value of the drive current are different, the cycles 200 and 201 are repeated using an adjusted value of the voltage Vd2. This process is repeated until the read value and the reference value of the drive current are substantially the same, and then the adjusted value of Vd2 can be used to determine $V_{OLED}$.

Figure 3:
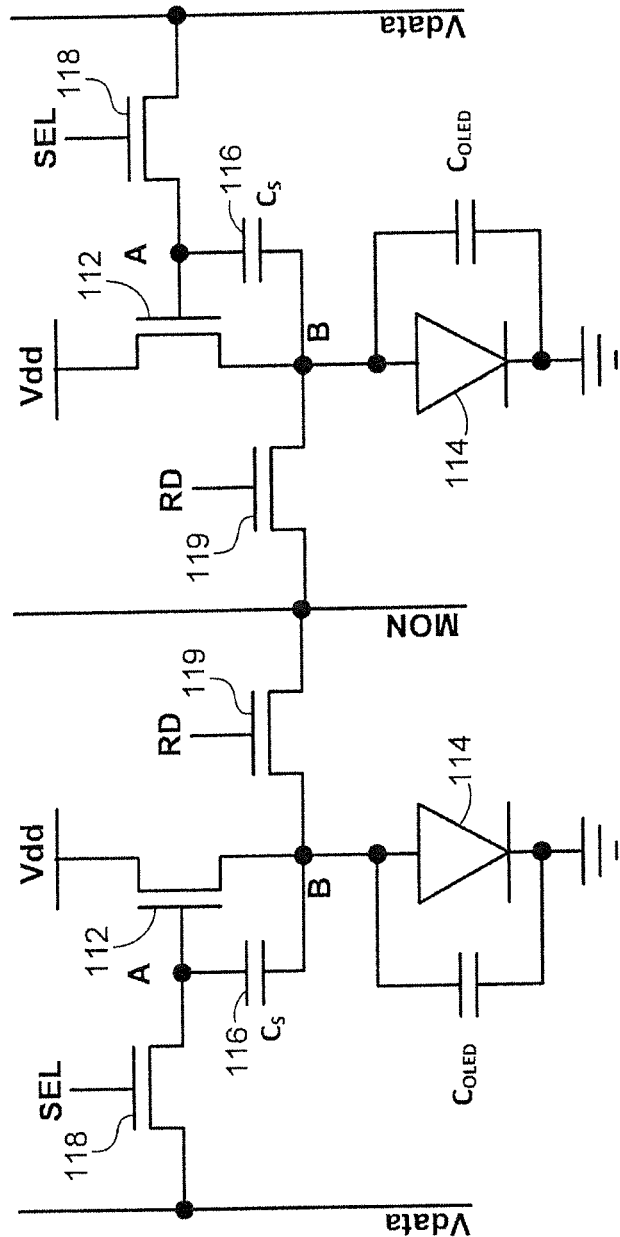
FIG. 3 is a circuit diagram of another exemplary pixel circuit configuration.

FIG. 3 is a circuit diagram of two of the pixels 110a and 110b like those shown in FIG. 2A but modified to share a common monitor line MON, while still permitting independent measurement of the driving current and OLED voltage separately for each pixel. The two pixels 110a and 110b are in the same row but in different columns, and the two columns share the same monitor line MON. Only the pixel selected for measurement is programmed with valid voltages, while the other pixel is programmed to turn off the drive transistor 12 during the measurement cycle. Thus, the drive transistor of one pixel will have no effect on the current measurement in the other pixel.

Figure 4:
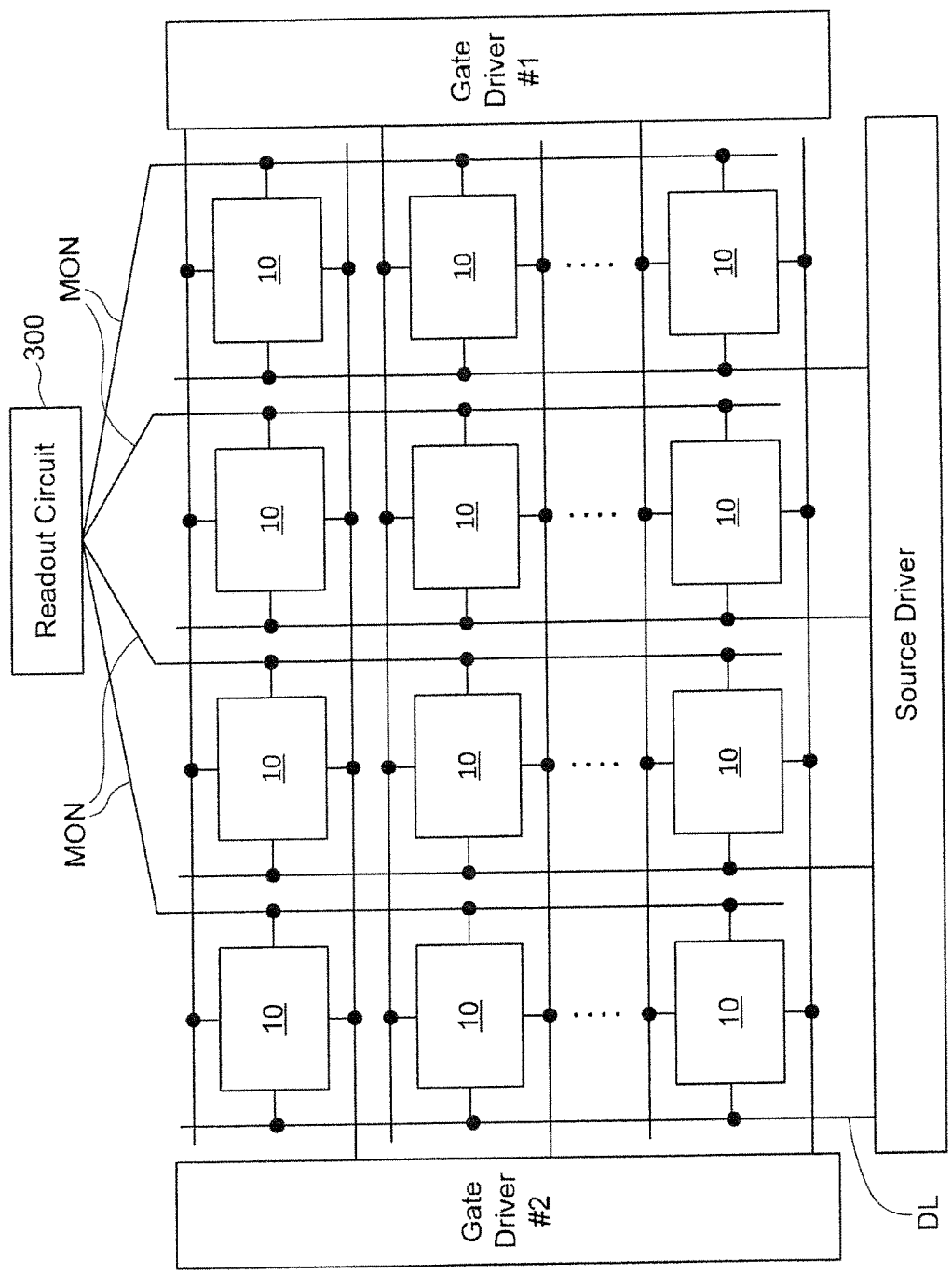
FIG. 4 is a block diagram of a modified configuration of a system for driving an OLED display using a shared readout circuit, while monitoring the degradation of the individual pixels and providing compensation therefor.

FIG. 4 illustrates a modified drive system that utilizes a readout circuit 300 that is shared by multiple columns of pixels while still permitting the measurement of the driving current and OLED voltage independently for each of the individual pixels 10. Although only four columns are illustrated in FIG. 4, it will be understood that a typical display contains a much larger number of columns, and they can all use the same readout circuit. Alternatively, multiple readout circuits can be utilized, with each readout circuit still sharing multiple columns, so that the number of readout circuits is significantly less than the number of columns. Only the pixel selected for measurement at any given time is programmed with valid voltages, while all the other pixels sharing the same gate signals are programmed with voltages that cause the respective drive transistors to be off. Consequently, the drive transistors of the other pixels will have no effect on the current measurement being taken of the selected pixel. Also, when the driving current in the selected pixel is used to measure the OLED voltage, the measurement of the OLED voltage is also independent of the drive transistors of the other pixels.

Figure 5:
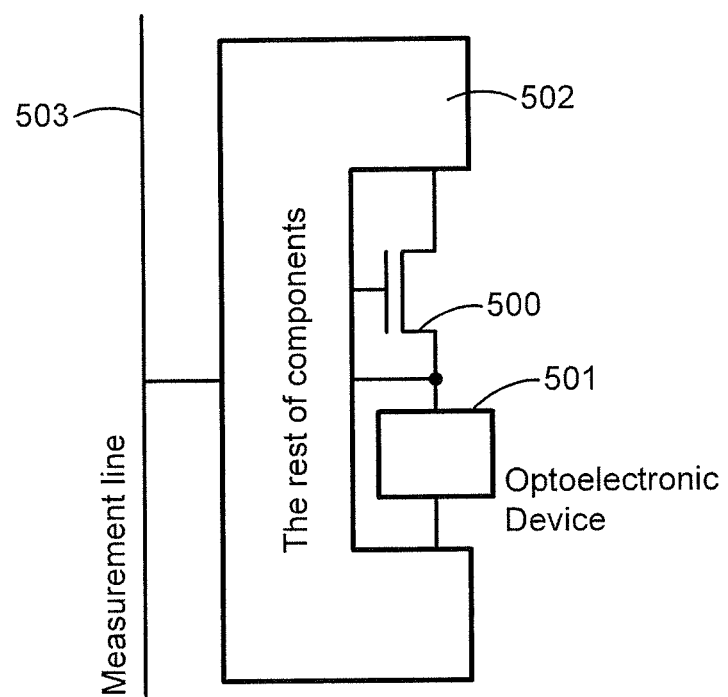
FIG. 5 is a schematic illustration of a pixel circuit having a driving transistor, an optoelectronic device, and a measurement line.

FIG. 5 illustrates one of the pixel circuits in a solid state device that includes an array of pixels. In the illustrative pixel circuit, a drive transistor 500 is connected in series with a load such as an optoelectronic device 501. The rest of the components 502 of the pixel circuit are coupled to a measurement line 503 that allows extraction of the characteristics of the driving part and/or the driven load for further calibration of the performance of the solid-state device. In this example, the optoelectronic device is an OLED, but any other device can be used.

Sharing a measurement (monitor) line with a plurality of columns can reduce the overhead area. However, sharing a monitor line affects the OLED measurements. In most cases, an OLED from one of the adjacent columns using a shared monitor line will interfere with measurement of a selected OLED in the other one of the adjacent columns.

In one aspect of the invention, the OLED characteristics are measured indirectly by measuring the effect of an OLED voltage or current on another pixel element.

In another aspect of the invention, the OLEDs of adjacent pixels with a shared monitor line are forced in a known stage. The selected OLED characteristic is measured in different stages, and the selected OLED characteristic is extracted from the measurement data.

In yet another aspect of the invention, the drive transistor is used to force the OLED samples to a known status. Here, the drive transistor is programmed to a full ON status. In addition, the power supply line can be modified to make the OLED status independent of the drive TFT characteristics. For example, in the case of a pixel circuit with an n-type transistor and the OLED at the source of the drive transistor, the drain voltage of the drive transistor (e.g., the power supply) can be forced to be lower than (or close to) the full ON voltage of the drive TFT. In this case, the drive transistor will act as a switch forcing the OLED voltage to be similar to the drain voltage of the drive TFT.

In a further aspect of the invention, the status of the selected OLED is controlled by the measurement line. Therefore, the measurement line can direct the characteristics of a selected OLED to the measurement circuit with no significant effect from the other OLED connected to the measurement line.

In a still further aspect of the invention, the status of all the OLED samples connected to the shared monitor lines is forced to a known state. The characteristic is measured, and then the selected OLED is set free to be controlled by the measurement line. Then the characteristic of a selected OLED sample is measured. The difference between the two measurements is used to cancel any possible contamination form the unwanted OLED samples.

In yet another aspect of the invention, the voltage of the unwanted OLED samples is forced to be similar to the voltage of the measurement line. Therefore, no current can flow from the OLED lines to the measurement line.

Figure 6:
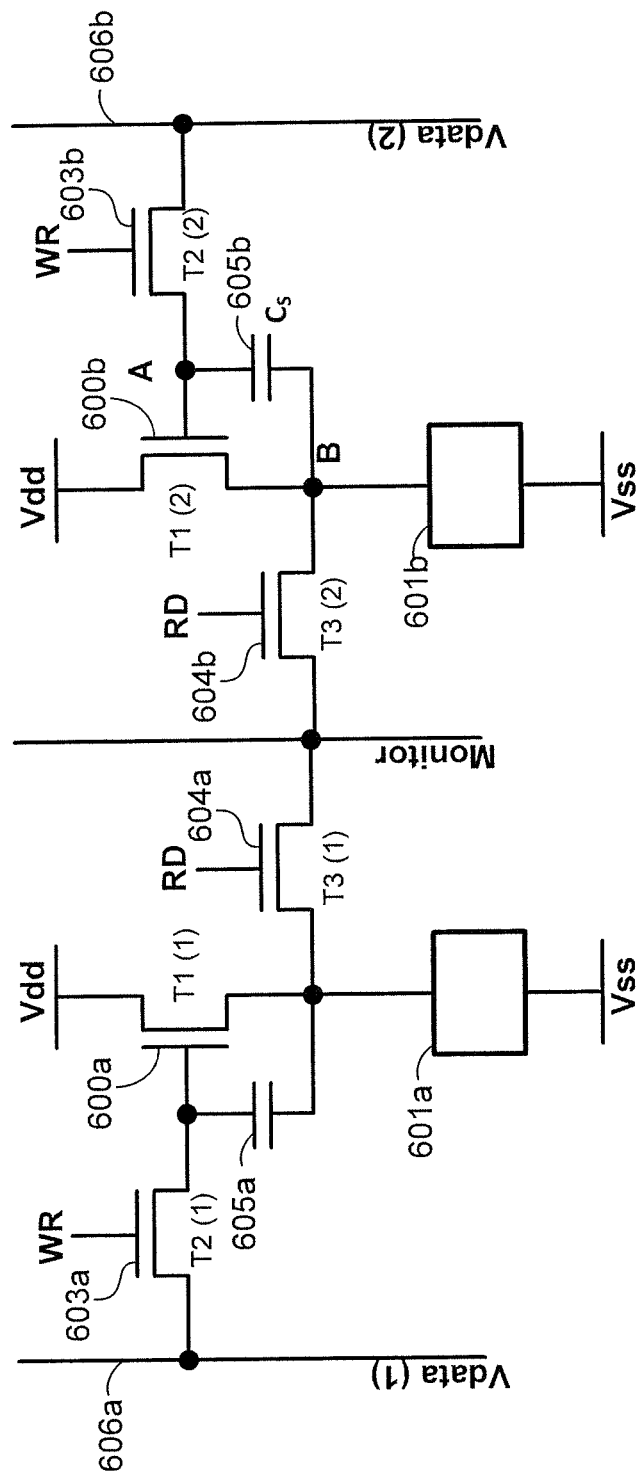
FIG. 6 is a circuit diagram of a pair of pixel circuits having a shared monitor line.

FIG. 6 illustrates a pair of pixel circuits that share a common monitor line 602 for adjacent pixel circuits having respective drive transistors 600a, 600b driving corresponding optoelectronic devices 601a, 601b. The adjacent pixel circuits also have respective write transistors 603a, 603b, read transistors 604a, 604b, storage capacitors 605a, 605b, and data lines 606a, 606b. The methods described above and hereafter can be applied to different pixel circuits, and this is just an example.

During a first phase, the voltage Vdd is set to the voltage of the monitor line, and the drive transistors 600a, 600b are programmed to be in a full ON stage. While the read transistors 604a, 604b are ON, the current through these transistors and the monitor line 602 is measured. This current includes all the leakages to the monitor line and other non-idealities. If the leakage current (and non-idealities) is negligible, this phase can be omitted. Also, the drive voltages Vdd need not be changed if the drive transistors are very strong.

During a second phase, the drive transistor of the selected OLED is set to an OFF stage. Thus, the corresponding optoelectronic device is controlled by the monitor line 602. The current of the monitor line 602 is measured again.

The measurements can highlight the changes in the current of the first optoelectronic device for a fixed voltage on the monitor line. The measurement can be repeated for different OLED voltages to fully characterize the OLED devices.

While the device goes in standby, the display can show some basic information. For example, in some wearable devices (e.g., smart watches or exercise bands) the display shows some content all the time. The main challenge in this case is the power consumption associated with the display. This power includes both static power stemming from the backlight or the emissive device in the pixel and dynamic power associated with refreshing the display.

To reduce the static power, the brightness of the display can be reduced, or only a section of the display can be ON and the rest be OFF (or at lower brightness). This also can help the dynamic power consumption since only a small section of the display needs to be programmed.

Figure 7:
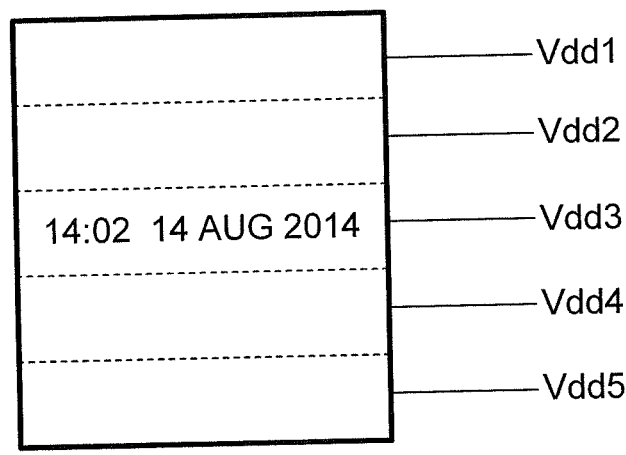
FIG. 7 is a diagrammatic illustration of a display with segmented VDD for power saving.

FIG. 7 illustrates a display with a segmented power supply Vdd1-Vdd5 for power saving. Here each of five different horizontal segments of the display is supplied with a different voltage so that the voltage of each segment can be controlled separately. Each segment can be assigned to a different voltage or disconnected from any voltage levels. For example, during a standby mode, only the $3^{rd}$ segment may be ON, as depicted in FIG. 7. Therefore only the content for the $3^{rd}$ segment needs to be transferred to the display, and thus both the dynamic and static power consumption will be reduced by 80%. The display can be segmented either vertically or horizontally, or in both directions, with each segment receiving a separate power supply. In one example, the VDD and VSS can be adjusted in the same direction (horizontal or vertical). In another example, VDD and VSS can be adjusted in different directions (one in horizontal and the other one in vertical). It is also possible to segment in other directions, such as diagonal. Here, the power lines can be connected to different voltage levels through switches or can be disconnected from all the voltages.

One case of power adjustment uses a multiplexer to connect different voltage levels to different segments. In another case, the power supply can be adjusted at the pixel level. In this case, the power supply can be adjusted at vertical or horizontal segments or the combination of the two cases. In one example, the VDD and VSS can be adjusted in the same direction (horizontal, vertical or other directions such as diagonal). In another example, VDD and VSS can be adjusted in different directions (e.g., one horizontal and the other vertical, or in other directions such as diagonal).

Figure 8:
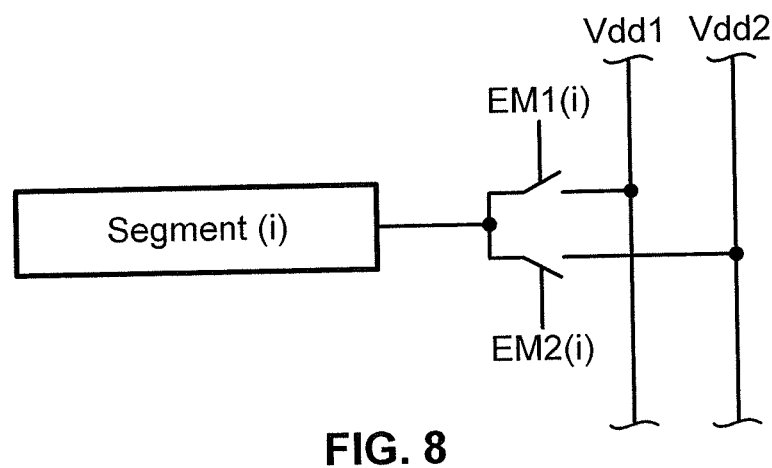
FIG. 8 is a schematic diagram of an electrical circuit for adjusting the power supply at a segment level.

FIG. 8 is a schematic of an electrical circuit for adjusting the power supply at a segment level. Here, a segment (i) can be connected to either of a pair of different voltages Vdd1 and Vdd2 through a pair of controllable switches EM1(i) and EM2(i), or can be disconnected from both the voltages. One case of power supply modification at the pixel level uses emission switches to connect individual pixels, or groups of pixels, to different power supplies. The emission switches may be controlled with a generic signal for each segment. In this case, the power supply can be adjusted at vertical or horizontal segments or a combination of both. In one example, the VDD and VSS can be adjusted in the same direction (horizontal, vertical, diagonal, etc.). In another example, VDD and VSS can be adjusted in different directions (e.g., one in horizontal, the other one in vertical).

Figure 9A:
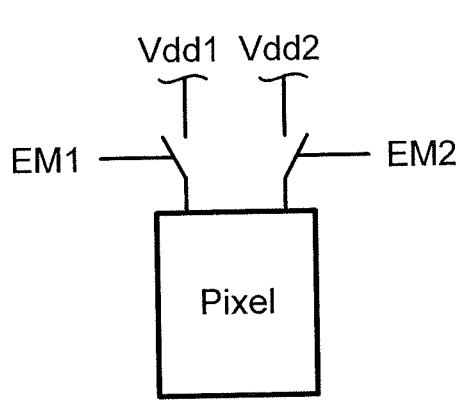
FIG. 9A is a schematic diagram of an electrical circuit for adjusting the power supply to a pixel from Vdd sources.
Figure 9B:
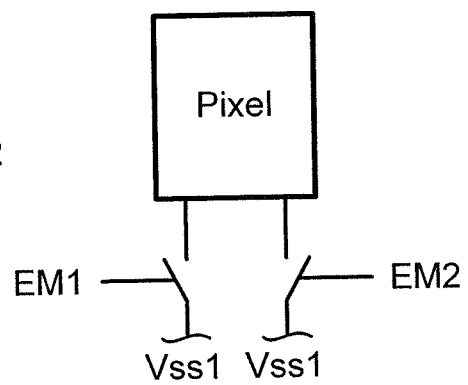
FIG. 9B is a schematic diagram of an electrical circuit for adjusting the power supply to a pixel from Vss sources.

FIGS. 9A and 9B are schematic of electrical circuits for adjusting the power supply at the pixel level. Here, the power lines from Vdd1 and Vdd2 or Vss1 and Vss2 can be connected to different pixels through respective controllable switches EM1 and EM2, or any pixel can be disconnected from the voltages all together.

Figure 10:
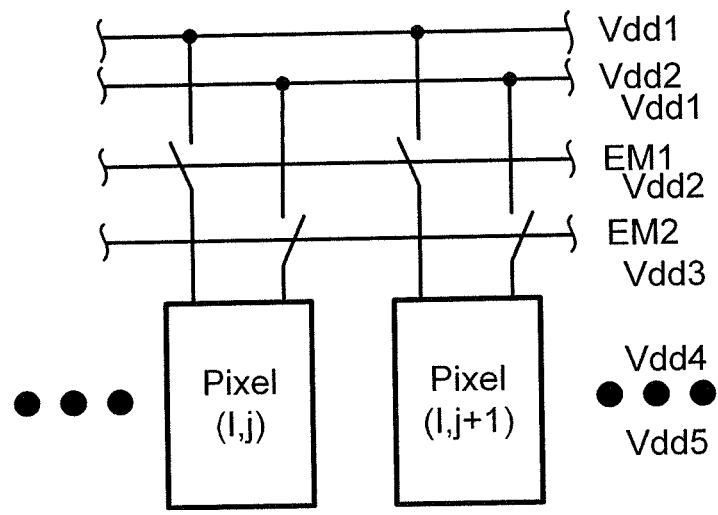
FIG. 10 is a schematic diagram of a pixel arrangement for adjusting the power supply at the pixel level.
Figure 11:
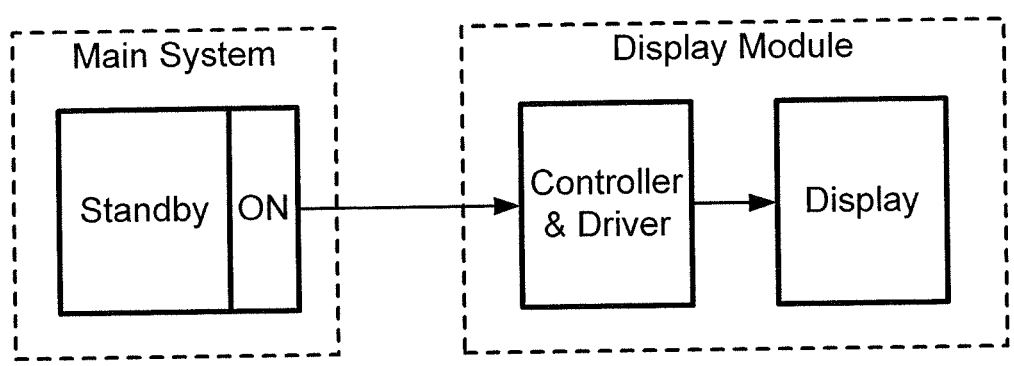
FIG. 11 is a block diagram of a system in standby mode with a display showing active content.

FIG. 10 is a schematic diagram of a pixel arrangement for adjusting the power supply at the pixel level. For dynamic power consumption, one can reduce the refresh rate (frame rate) of the display. However, if the content of the display is changing over time (for example, a watch face) this content needs to be produced and transferred to the display. As a result, part of the main system will be on and there will be power consumption associated with transferring data from the main system to the display. FIG. 11 illustrates a system in standby mode with a display showing active content.

To eliminate the extra power consumption associated with transferring data between the main system and the display during the standby mode, some basic functionality can be added to the display driver to produce recursive changes in the content. For example, the driver can have multiple frame buffers, which are pre-populated by the main system in advance (e.g., before going to the standby mode, or during boot-up or power-up) and depending on different conditions, one of the frame buffers may be used to program the display. For example, a timer can be used to flip between the frame buffers (see FIG. 9). The main issue in this case is that for some applications, such as a watch face, there are many different combinations that will require significantly large memory to store them as full frame buffers.

Figure 12:
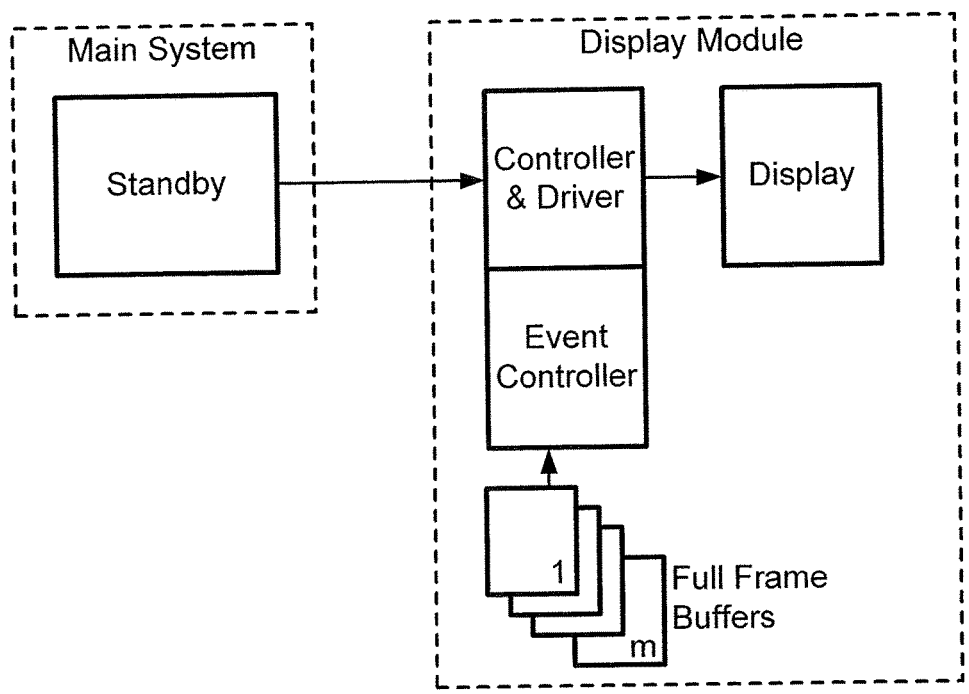
FIG. 12 is a block diagram of a display module with multiple frame buffers for supporting active content during standby.
Figure 13:
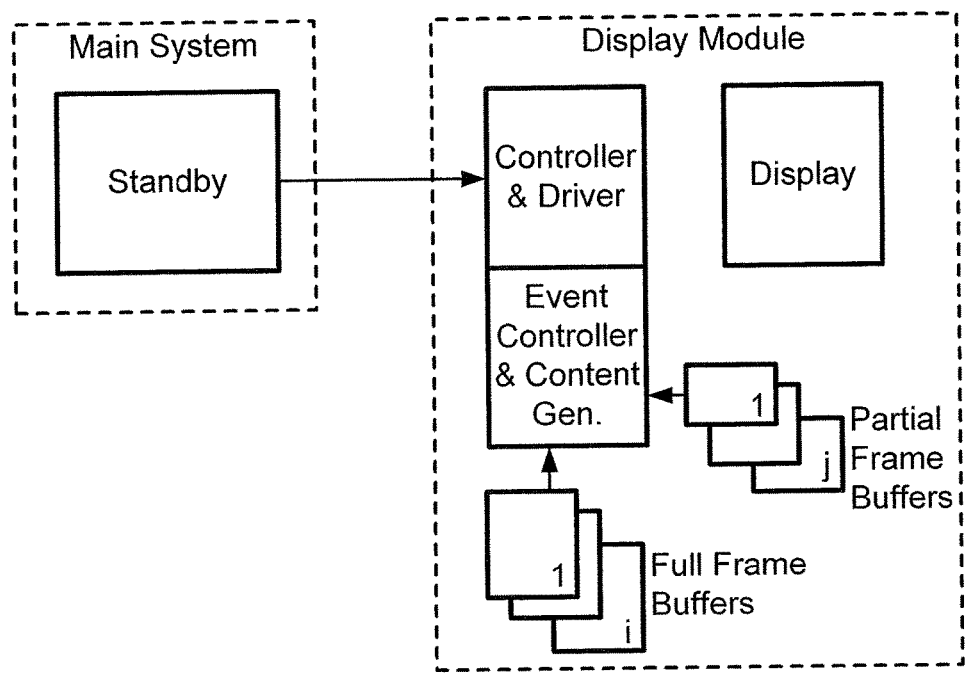
FIG. 13 is a block diagram of a display module with frame buffers and content generation module for supporting active content during standby.

FIG. 12 illustrates a display module with multiple frame buffers for supporting active content during standby. The driver can have a plurality of full frame buffers, and the other partial frame buffers only store the changes applied to one of the full frame buffers based on certain conditions. For example, the hand positions in a watch face can be stored as the changes to the watch face in partial frame buffers, while the watch face itself is stored in the full frame buffer. An exemplary block diagram of a display with a full frame buffer and a partial frame buffer is illustrated in FIG. 13, which shows a display module with frame buffers and a content generation module for supporting active content during standby. Here, the content generator module selects a full frame buffer and a partial frame buffer based on some conditions, and it modifies the image stored in the full frame buffer based on the information in the partial frame buffer. Also, one can use the multiple full and partial frame buffers to create a new content.

Alternatively, the driver can perform some basic calculation such as moving an object by a trajectory. In this case, for different conditions, some part of the image in the full frame buffers is moved based on a trajectory, or the object stored in the partial frame buffer is moved and the main frame buffer is modified by the new calculated object.

Figure 14:
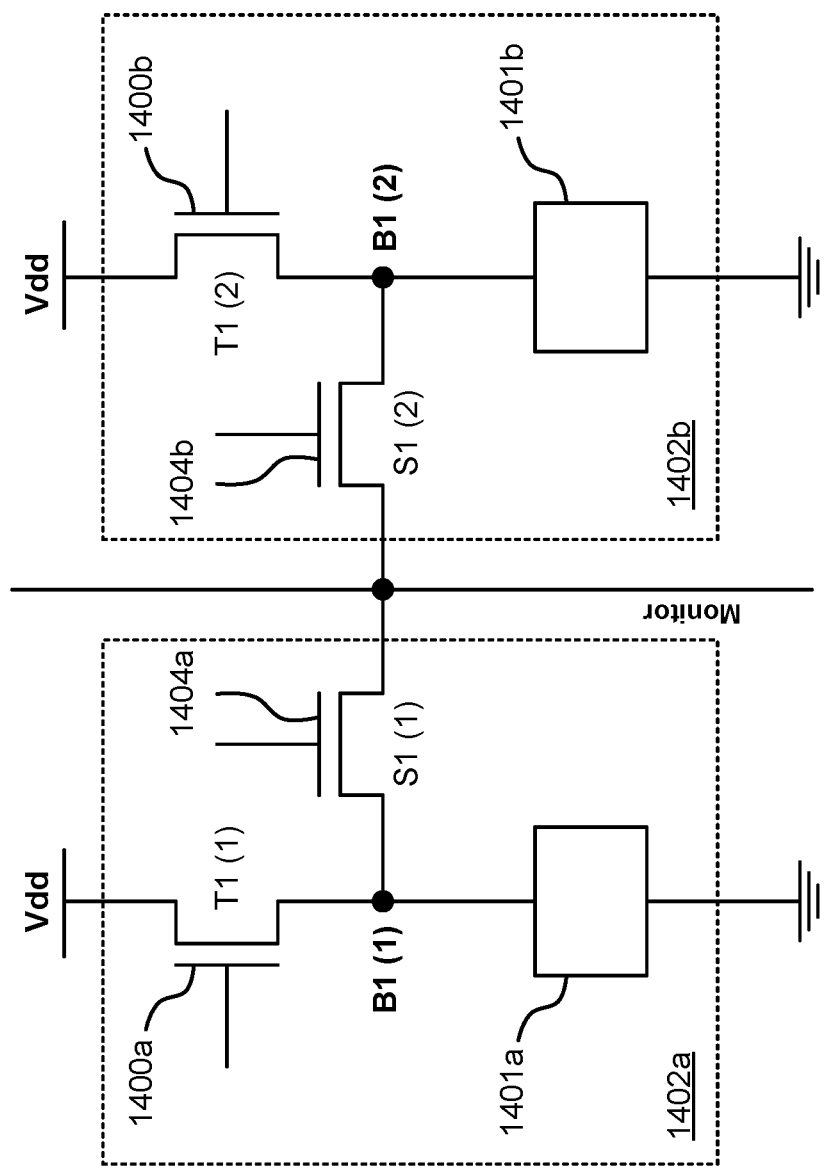
FIG. 14 is a circuit diagram of a pair of pixel circuits having a shared monitor line according to another embodiment.

Referring to FIG. 14, a further embodiment directed to measuring characteristics of optoelectronic devices 1401a, 1401b and drive transistors 1400a, 1400b of pixels 1402a, 1402b which share a monitor line (Monitor) will now be described. Although traditionally it can pose a challenge, sharing a monitor line and/or data lines and/or select lines provides simpler pixels and enables higher yield (more pixels per inch) and higher fill factors.

The first pixel 1402a includes a first drive transistor 1400a having one of a source and a drain terminal coupled to supply voltage VDD, and the other of its source and drain terminals coupled to a first optoelectronic device 1401a which in turn is coupled to ground or alternatively VSS. The second pixel 1402b includes a second drive transistor 1400b having one of its source and drain terminals coupled to supply voltage VDD, and the other of its source and drain terminals coupled to a second optoelectronic device 1401b which in turn is coupled to ground or alternatively VSS. A first node B1 (1) between the first drive transistor 1400a and the first optoelectronic device 1401a is coupled across a first source switch 1404a to the monitor line while a second node B1 (2) between the second drive transistor 1400b and the second optoelectronic device 1401b is coupled across a second source switch 1404b to the monitor line. The first and second optoelectronic devices 1401a, 1401b may be OLEDs and are driven by the drive transistors 1400a, 1400b. For clarity of the principles of operation of the embodiment, not shown in FIG. 14 are storage elements for storing pixel programming data and other elements which may or may not be present. The source switches 1404a, 1404b provide functionality similar to the read transistors of FIG. 3 and FIG. 6 allowing monitoring and biasing of elements of the first and second pixel 1402a, 1402b circuits. In some embodiments the source switches 1404a, 1404b also provide select and write functionality similar to the switching transistors 118, 603a, 603b of FIG. 3 and FIG. 6. In general it should be understood that the methods of embodiments described in association with FIG. 14 are applicable to different pixel circuits.

In one aspect, a drive transistor 1400a, 1400b is used to push the associated optoelectronic device 1401a, 1401b in an off state. In other words, the biasing conditions of pixels that are not being measured are changed so as to force the optoelectronic device 1401a, 1401b of that pixel 1402a, 1402b to be off. For example, when measuring the first pixel 1402a including optoelectronic device 1401a, in the second pixel 1402b, biasing conditions such as control of the state of the drive transistor 1400b, are such that optoelectronic device 1401b turns off. The biasing conditions which control the second drive transistor 1400b include VDD and the voltage applied to the gate of the second drive transistor 1400b. As a result, only the intended device i.e., that being measured (in this example optoelectronic device 1401a) is controlled by the monitor line biasing condition and so the voltage or current or the charge created by the intended device can be measured.

In another aspect, the drive transistor 1400a, 1400b forces the current through the associated source switches 1404a, 1404b to be zero or a fixed known current. In this case, the drive transistor 1400a, 1400b makes the voltage across the source switches 1404a, 1404b connected to the devices not intended for measurement to be zero or of a fixed value known to give rise to the fixed known current. A detailed example implementation of this embodiment is described further below.

In another aspect, the intended pixel for measurement of its optoelectronic device 1404a, 1404b is biased at a few different biasing points. This can be done through programming the pixel with different bias levels and/or the monitor line bias level can be modified. From different bias levels and measurement values, the characteristics of the optoelectronic device can be extracted. This can, for example, be performed for both the first pixel 1402a and the second pixel 1402b simultaneously, involving the variation of various biasing inputs and taking sufficient measurements to solve for the unknowns of the devices being characterized, including up to all of both the drive transistors 1400a, 1400b, and both the optoelectronic devices 1401a, 1401b. In one example embodiment, four biasing conditions, VDD, the gate voltage applied to the first drive transistor 1400a, the gate voltage applied to the second drive transistor 1400b, the signal applied to the gates of the source switches 1404a, 1404b, and a biasing level provided over the monitor line are the five possible inputs and the current of each of the four devices, i.e. of the first and second drive transistors 1400a, 1400b, and of the first and second optoelectronic devices 1401a, 1401b are the four unknowns which are solved.

The measurements in the aforementioned cases can be carried out with direct measurements of the voltage or current, in a comparator based manner, or by adjusting one or more bias conditions to progressively determine bias conditions in one or more devices in the pixels.

One example measurement method which forces the current through the a source switches 1404a, 1404b of a pixel not being measured to be zero or a fixed known current, will now be described as used to measure the first optoelectronic device 1401a, of a selected pixel of interest. In this method, the associated first drive transistor 1400a is turned off and other drive transistors (such as the second drive transistor 1400b) of pixels which share the monitor line but which are not being measured (such as the second pixel 1402b), are turned fully on and act as switches. As a result, the voltage at node B1 (2) in the non-measured pixels is set to equal that of VDD. By arranging for the voltage VDD to be the same as the voltage at the monitor line, the current through the second source switch 1404b will be very small. In cases where VDD at node B1 (2) and the voltage at the monitor line are not the same, the current that is capable of passing through the second source switch 1404b with the voltage difference can be measured first and then that measured fixed known current can be subtracted from the measurements of the pixel of interest. During measurement of the current in response to the voltage difference across the second source switch 1404b, the same voltage difference is applied across the second source switch 1404b in order to produce the small current which later is subtracted from the measurements, but the voltages (VDD and that on the monitor line) are chosen so that optoelectronic devices 1404a, 1404b are off. The gate voltages of the driving transistors 1400a, 1400b, as well as VDD can be manipulated to isolate the small current. For example, with both drive transistors 1400a, 1400b fully on and the optoelectronic devices 1401a, 1401b off by virtue of VDD (and hence the voltage at B1(1) and B1(2)) being low enough, the voltage of the monitor line can be set at the same level as VDD. The first drive transistor 1400a can then be set fully off, and VDD varied to the desired voltage difference from the monitor line (which does not affect B1 (1) because the first drive transistor 1400a is off) to produce a delta current through the second source switch 1404b while the optoelectronic devices 1401a, 1401b remain off. This is the fixed known current through the second source switch 1404b in response to the voltage difference.

In this way, once the various small currents through the second source switch 1404b have been isolated and measured for known voltage differences between B1(2) and the monitor line, the first optoelectronic device 1401a, of interest is turned on with high enough voltages (monitor line) while, as described above, the first drive transistor 1400a is turned off and the second drive transistor 1400b is turned on. The current passing through the first source switch is related to that of the first optoelectronic device 1401a and can be isolated by subtracting the fixed known current (due to the known voltage difference between the node B1 (2) and the monitor line) through the second source switch 1404b from the measurement.

As described in association with other embodiments above, indirect measurement can be made by adjusting the bias on the gate of the drive transistor 1400a, 1400b of the pixel of interest 1402a, 1402b, until the current through the associated source switch 1404a, 1404b is fixed (it can be zero or a non-zero value). In this case, the current passing through the drive transistor 1400a, 1400b of the pixel of interest in response to biasing would have had to have been measured first, i.e., characterized independently while the associated optoelectronic device 1401a, 1401b was off. Knowing the change in the current of the drive transistor 1400a, 1400b (from the change in the voltage applied) which results in the zero or some fixed known current through the associated source switch 1404a, 1404b gives an indirect change of current through the associated optoelectronic device 1401a, 1401b.

It should be understood that FIG. 14 shows an example pixel structure with a shared monitor line. The positions of the optoelectronic devices or the types of transistors can be changed without departing from the broad methods described. Although FIG. 14 depicts the monitor line shared between two pixels in a row, it should be understood that it can be shared between more than two. Moreover, the sharing can be implemented at pixel level or at the boundary of array.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A method of determining a characteristic of a circuit element of a first pixel of a display device, the first pixel sharing a monitor line with a second pixel of the display device, the method comprising:
   biasing the first pixel;
   biasing the second pixel to fix a current passing through the second pixel over the monitor line to a known current; and
   measuring the characteristic of the circuit element of the first pixel with use of said monitor line.

2. The method of claim 1, wherein measuring the characteristic of the circuit element of the first pixel with use of said monitor line comprises measuring a current over the monitor line.

3. The method of claim 2, wherein measuring the characteristic of the circuit element of the first pixel with use of said monitor line further comprises subtracting from a current value of the measured current a current value of the known current.

4. The method of claim 1, wherein the known current is zero.

5. The method of claim 1, wherein biasing the second pixel comprises biasing an optoelectronic device of the second pixel to turn off the optoelectronic device.

6. The method of claim 5, wherein the second pixel includes a drive transistor for supplying current to the optoelectronic device and coupled between a supply voltage and the optoelectronic device, and wherein biasing the optoelectronic device comprises biasing the drive transistor to set a voltage at a node between the drive transistor and the optoelectronic device, to bias the optoelectronic device and turn the optoelectronic device off.

7. The method of claim 1, wherein the second pixel includes a source switch coupled between the monitor line and remaining elements of the second pixel, and wherein biasing the second pixel comprises biasing the source switch.

8. The method of claim 7, wherein biasing the source switch comprises biasing with a known voltage difference across a source and a drain of the source switch resulting in the known current passing through the source switch.

9. The method of claim 8, wherein the known voltage difference is zero.

10. The method of claim 8, further comprising prior to biasing with the known voltage difference across the source and the drain of the source switch, determining the known voltage difference across the source and the drain of the source switch which results in the known current passing through the source switch including:
    biasing the first pixel to turn off an optoelectronic device of the first pixel and then biasing the first pixel to turn off a drive transistor of the first pixel;
    biasing the monitor line to a first voltage and biasing the second pixel so that the known current passes through the source switch as a result of a particular voltage difference across the source and the drain of the source switch; and
    determining the known voltage difference from the particular voltage difference.

11. The method of claim 8, wherein the first pixel includes a drive transistor for supplying current to an optoelectronic device of the first pixel and coupled between a supply voltage and the optoelectronic device, and wherein biasing the first pixel comprises biasing the drive transistor to turn the drive transistor off and biasing over the monitor line the optoelectronic device to turn the optoelectronic device on.

12. The method of claim 11, further comprising prior to the biasing with the known voltage difference across the source and the drain of the source switch, determining the known voltage difference across the source and the drain of the source switch which results in the known current passing through the source switch including:
    biasing the first pixel to turn off the optoelectronic device and then biasing the first pixel to turn off the drive transistor;
    biasing the monitor line to a first voltage and biasing the second pixel so that the known current passes through the source switch as a result of a particular voltage difference across the source and the drain of the source switch; and
    determining the known voltage difference from the particular voltage difference.

13. The method of claim 1, further comprising prior to biasing the second pixel to fix the current passing through the second pixel over the monitor line to the known current, determining the known current which results from said biasing of the second pixel by:
  varying a biasing of the second pixel so that the known current passes through the source switch as a result of a particular biasing of the second pixel; and
  determining the biasing of the second pixel from the particular biasing of the second pixel.

14. The method of claim 1, wherein the first pixel includes a drive transistor for supplying current to an optoelectronic device of the first pixel and coupled between a supply voltage and the optoelectronic device, and wherein the first pixel includes a source switch coupled between the monitor line and remaining elements of the first pixel, and wherein biasing the first pixel comprises:
  at a first time, biasing the drive transistor to cause a first current to pass through the source switch; and
  at a second time after the first time, adjusting a biasing of the drive transistor to maintain the same first current passing through the source switch;
  determining a change in a current characteristic of the optoelectronic device from the change in the biasing of the drive transistor which maintains the same first current passing through the source switch.

* * * * *